(12) United States Patent
Morita et al.

(10) Patent No.: US 12,090,392 B2
(45) Date of Patent: Sep. 17, 2024

(54) OPERATION INPUT DEVICE AND BUTTON DRIVING UNIT

(71) Applicant: Sony Interactive Entertainment Inc., Tokyo (JP)

(72) Inventors: Masaho Morita, Tokyo (JP); Ryo Fukikoshi, Saitama (JP); Kenji Kawashima, Tokyo (JP); Takeshi Igarashi, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 303 days.

(21) Appl. No.: 17/594,854

(22) PCT Filed: May 20, 2020

(86) PCT No.: PCT/JP2020/020019
§ 371 (c)(1),
(2) Date: Nov. 1, 2021

(87) PCT Pub. No.: WO2020/235614
PCT Pub. Date: Nov. 26, 2020

(65) Prior Publication Data
US 2022/0305375 A1    Sep. 29, 2022

(30) Foreign Application Priority Data
May 23, 2019  (JP) ................................. 2019-096639

(51) Int. Cl.
*A63F 13/24*    (2014.01)
*H02K 7/116*    (2006.01)

(52) U.S. Cl.
CPC .............. *A63F 13/24* (2014.09); *H02K 7/116* (2013.01)

(58) Field of Classification Search
CPC .......... G05G 1/02; A63F 13/24; A63F 13/285
See application file for complete search history.

(56) References Cited

U.S. PATENT DOCUMENTS 869,247 A * 10/1907 Keiper
8,664,551 B2    3/2014 Nakajima
(Continued)

FOREIGN PATENT DOCUMENTS

| CN | 102906845 A | 1/2013 |
| CN | 105339871 A | 2/2016 |

(Continued)

OTHER PUBLICATIONS

Office Action for corresponding CN Application No. 202080036035.4, 23 pages, dated Feb. 7, 2023.
(Continued)

*Primary Examiner* — James S. McClellan
(74) *Attorney, Agent, or Firm* — Matthew B. Dernier, Esq.

(57) ABSTRACT

An improvement is achieved in workability in an operation of assembling an operation input device having a function of applying a reaction force in response to a movement of an operation button. An input device (100) has an operation button (20), a movable member (30) capable of pushing the operation button (20) toward an initial position, and an electric motor (35) that moves the movable member (30). The input device (100) has a holder (40) that holds the electric motor (35). The holder (40) supports the operation button (20) and the movable member (30) so as to permit movement of the operation button (20) and the movable member (30).

18 Claims, 20 Drawing Sheets

(56) References Cited

U.S. PATENT DOCUMENTS

| | | |
|---|---|---|
| 2013/0037392 A1 | 2/2013 | Nakajima |
| 2017/0351332 A1 | 12/2017 | Grant |
| 2018/0018020 A1* | 1/2018 | Grant .................... G06F 3/0338 |
| 2018/0210554 A1 | 7/2018 | Hagiwara |
| 2018/0345134 A1* | 12/2018 | Schmitz ................ A63F 13/285 |

FOREIGN PATENT DOCUMENTS

| | | | |
|---|---|---|---|
| JP | 07124332 A | 5/1995 | |
| JP | 11276715 A | 10/1999 | |
| JP | 2008173186 A | 7/2008 | |
| JP | 2011203865 A | 10/2011 | |
| JP | 2018010639 A | 1/2018 | |
| JP | 2019071977 A | 5/2019 | |
| KR | 100983091 B1 | 9/2010 | |
| WO | 2016051986 A1 | 4/2016 | |
| WO | 2017061173 A1 | 4/2017 | |
| WO | 2017150128 A1 | 9/2017 | |

OTHER PUBLICATIONS

Extended European Search Report for corresponding EP Application No. 20809619.8, 9 pages, dated May 12, 2023.
International Search Report for corresponding PCT Application PCT/JP2020/020019, 2 pages, dated Aug. 18, 2020.
Notice of Reasons for refusal for corresponding JP Application No. 2021-520830, 8 pages, dated Dec. 14, 2022.
Notification of Fulfilling of Registration Formality for corresponding CN Application No. 202080036035.4, 9 pages, dated Oct. 30, 2023.
Notification of Reasons for Refusal for corresponding JP Application No. 2023-091877, 7 pages, dated Dec. 27, 2023.
Decision to Grant a Patent for corresponding JP Application No. 2023-091877, 4 pages, dated May 30, 2024.

* cited by examiner

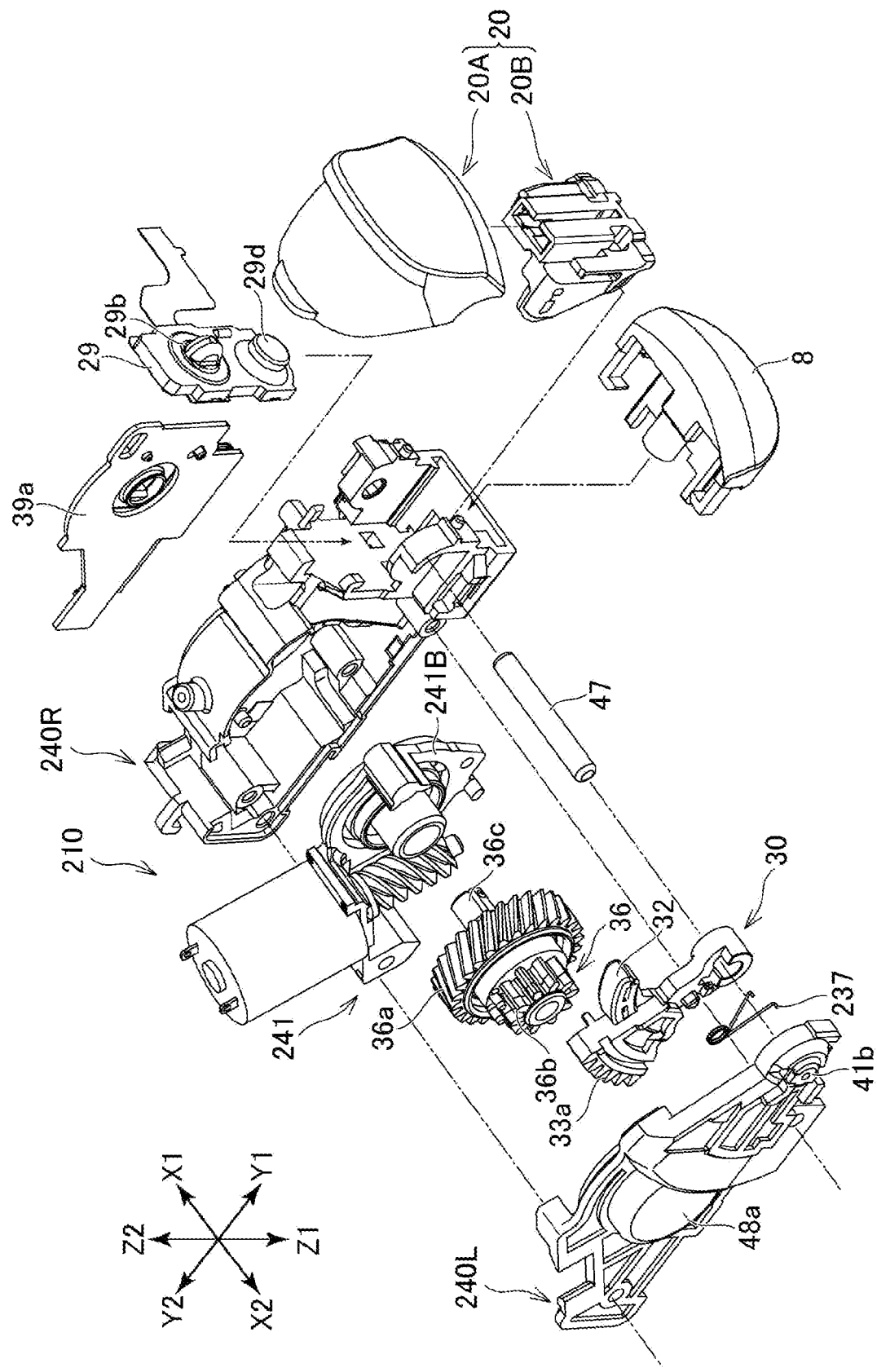

OPERATION INPUT DEVICE AND BUTTON DRIVING UNIT

TECHNICAL FIELD

The present invention relates to an operation input device and a button driving unit to be installed in an operation input device.

BACKGROUND ART

PCT Patent Publication No. WO2017/150128 discloses an operation input device capable of providing a user with a tactile sensation. In this operation input device, when the user pushes a button and the button reaches a predetermined position, a reaction force is applied to the button by driving of an electric motor contained in the operation input device.

SUMMARY

Technical Problem

An operation input device having a function of providing a user with a tactile sensation tends to have a greater number of components than an operation input device that does not have such a function. This results in an increased number of working processes for mounting the components in the operation input device.

Solution to Problem

An example of an operation input device proposed in the present disclosure has an operation button capable of moving from an initial position in a direction along a first plane when having received a pushing operation by a user, a movable member capable of moving in the direction along the first plane and capable of pushing the operation button toward the initial position, an electric motor that moves the movable member, and a holder that holds the electric motor, and supports the operation button and the movable member so as to permit movement of the operation button and the movable member. This operation input device is able to achieve improved workability in an operation of assembling the operation input device.

An example of a button driving unit proposed in the present disclosure has a body portion attached to an exterior portion of an operation button or formed integrally with the exterior portion. The operation button is capable of moving from an initial position in a direction along a first plane when having received a pushing operation by a user. This example of the button driving unit has a movable member capable of moving in the direction along the first plane and capable of striking against the body portion to push the operation button toward the initial position, an electric motor that moves the movable member, and a holder that holds the electric motor, and supports the body portion and the movable member so as to permit movement of the body portion and the movable member. This button driving unit is able to achieve improved workability in an operation of assembling an operation input device.

BRIEF DESCRIPTION OF DRAWINGS

FIG. 11A is an exploded perspective view illustrating another example of the button driving unit.

DESCRIPTION OF EMBODIMENT

Hereinafter, operation input devices proposed in the present disclosure will be described. In the present specification, an operation input device 100 used for operation of a game machine will be described as an example of the operation input devices proposed in the present disclosure (hereinafter, the operation input device will be referred to simply as an input device). Note that the present disclosure may be applied to input devices used for operation of information processing devices other than game machines (for example, an input device used for operation of a simulation device, input devices used for operation of a vehicle, a ship, an aircraft, etc.).

In the following description, directions indicated by "X1" and "X2" in FIG. 1 will be referred to as a rightward direction and a leftward direction, respectively, and directions indicated by "Y1" and "Y2" will be referred to as a forward direction and a rearward direction, respectively. In addition, directions indicated by "Z1" and "Z2" will be referred to as an upward direction and a downward direction, respectively. In the input device 100, a support shaft 47 (see FIG. 6) is disposed along a left-right direction, and in the following description, the "left-right direction" means a direction along an axis Ax1 of the support shaft 47. The above directions are used to describe relative positional relations between elements (components, members, and portions) of the input device 100, and are not used to identify the posture of the input device 100 when in use.

Figure 1:
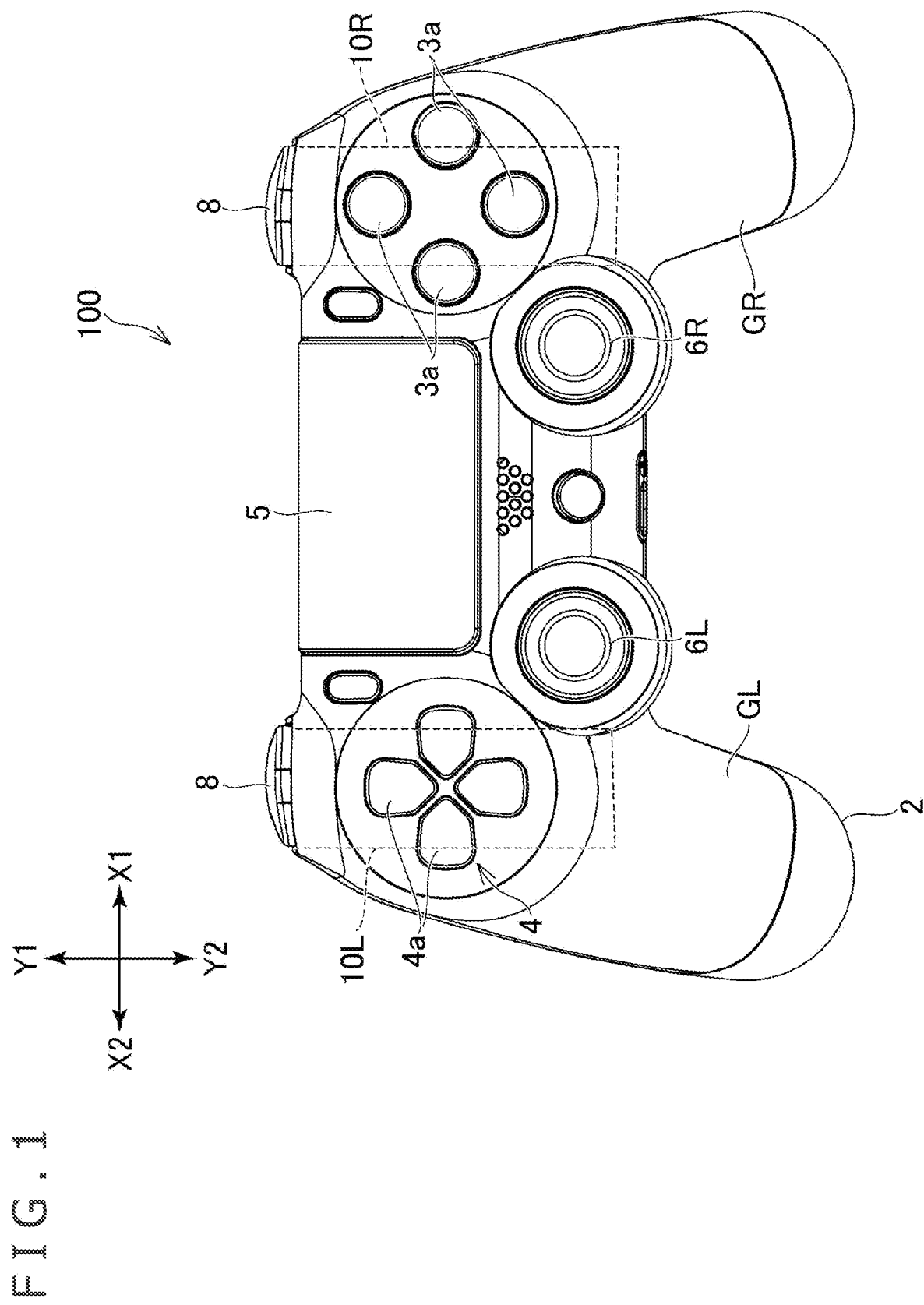
FIG. 1 is a plan view illustrating an example of an operation input device proposed in the present disclosure.

[Overall structure] As illustrated in FIG. 1, the input device 100 has a plurality of operation members on an upper surface thereof. For example, four operation buttons 3a are provided on a right part of the upper surface of the input device 100. In addition, a cross key 4 having four protruding portions 4a is provided on a left part of the upper surface of the input device 100. Further, a plate-shaped operation pad 5 is provided between the operation buttons 3a and the cross key 4. The operation pad 5 has, for example, a touch sensor for sensing the position of a finger of a user touching a surface of the operation pad 5. The operation pad 5 may be configured to be depressed in response to receiving a pushing operation by the user. Two joysticks 6R and 6L are provided on the rearward side of the operation pad 5. Each of the joysticks 6R and 6L can be tilted in a front-rear direction, the left-right direction, and directions at angles with these directions. In addition, the input device 100 has a grip portion GR extending rearward from a right part thereof, and a left grip portion GL extending rearward from a left part thereof.

When using the input device 100, the user operates the above-mentioned operation members while holding the grip portions GL and GR with left and right hands, respectively. The input device 100 is a device used by the user in a game play, and transmits signals in accordance with operations performed on the above-mentioned operation members to the game machine. The number of operation members, the types of the operation members, and the shape of the input device are not limited to the examples illustrated in FIG. 1. For example, the input device 100 may be configured to be held with one hand by the user. In this case, the number of joysticks and the number of grips may be one. In addition, the input device 100 may not have the operation pad 5.

Figure 2:
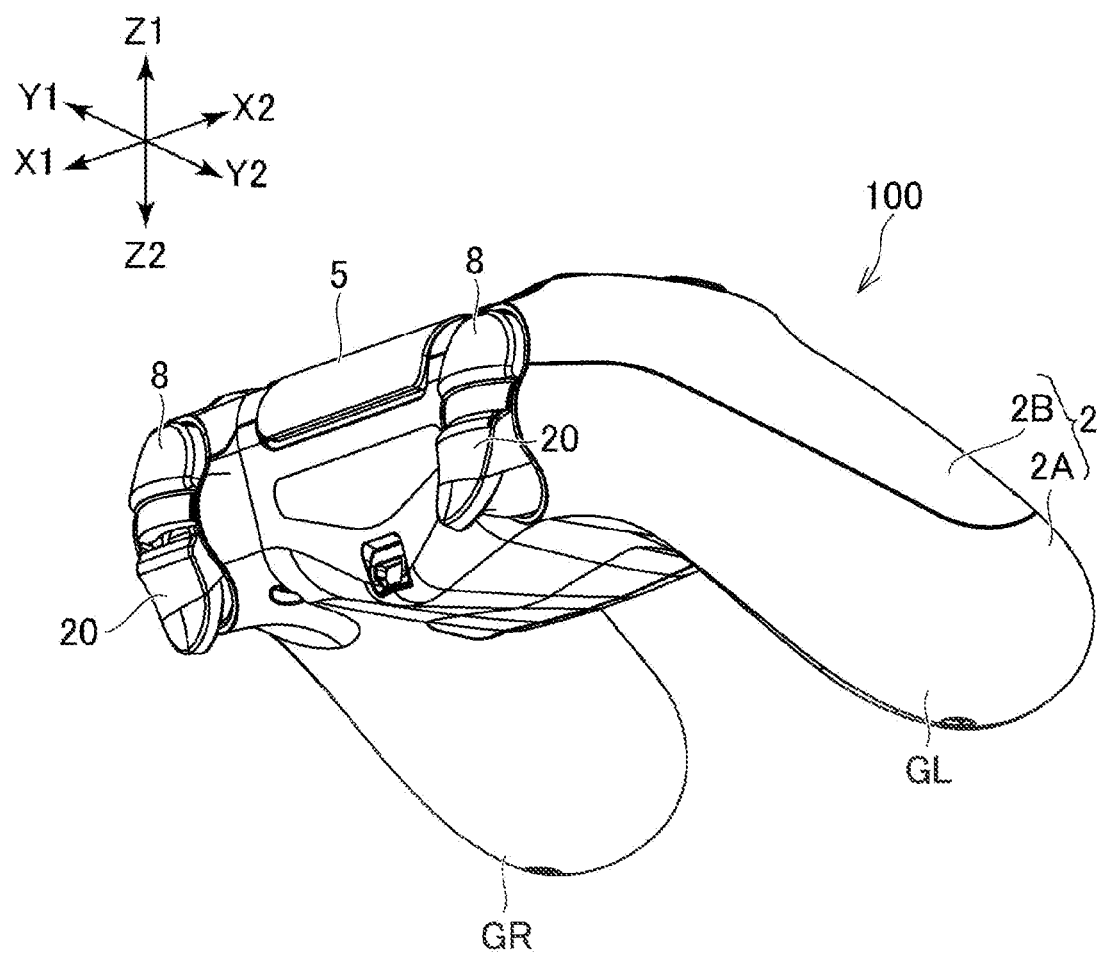
FIG. 2 is a perspective view of the operation input device.

As illustrated in FIG. 2, the input device 100 has a cabinet 2 that forms the exterior thereof. The cabinet 2 has, for example, a lower cabinet 2A that forms a lower-side portion thereof, and an upper cabinet 2B that forms an upper-side portion thereof and which is coupled to the lower cabinet 2A in an up-down direction. The above-mentioned operation members, such as the operation buttons 3a, the cross key 4, and the joysticks 6R and 6L, project upward through openings defined in the upper cabinet 2B. The operation pad 5 is disposed inside an opening defined in the upper cabinet 2B.

As illustrated in FIG. 2, the input device 100 has a plurality of operation members on a front surface thereof as well. Specifically, an operation button 8 and an operation button 20 are provided on a right part of the front surface, and an operation button 8 and an operation button 20 are provided on a left part of the front surface as well. The operation buttons 20 are disposed below the operation buttons 8.

Figure 10A:
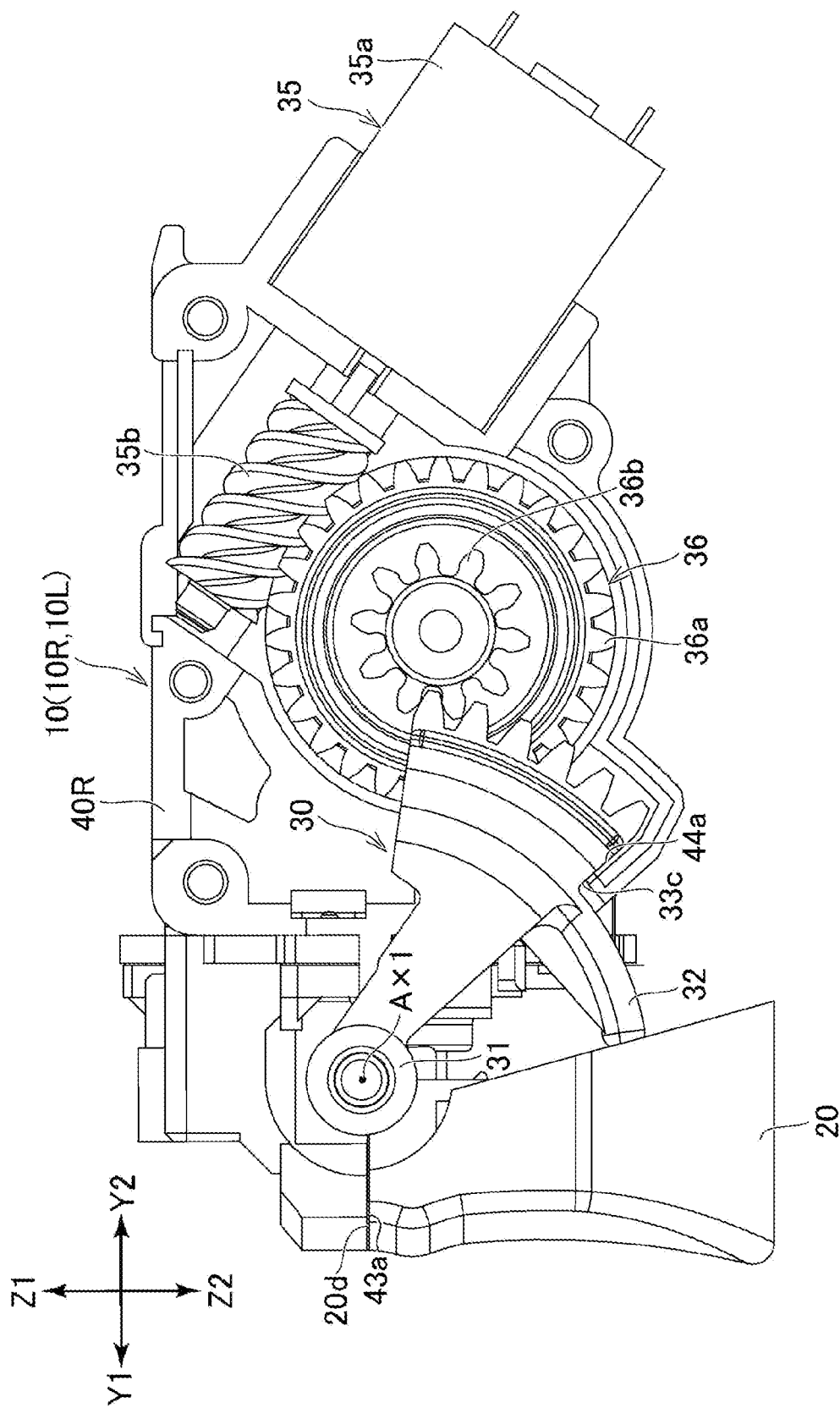
FIG. 10A is a side view illustrating the internal structure of the button driving unit with the right holder member removed therefrom. The operation button is disposed in an initial position, and the movable member is disposed in the most forward position.
Figure 10B:
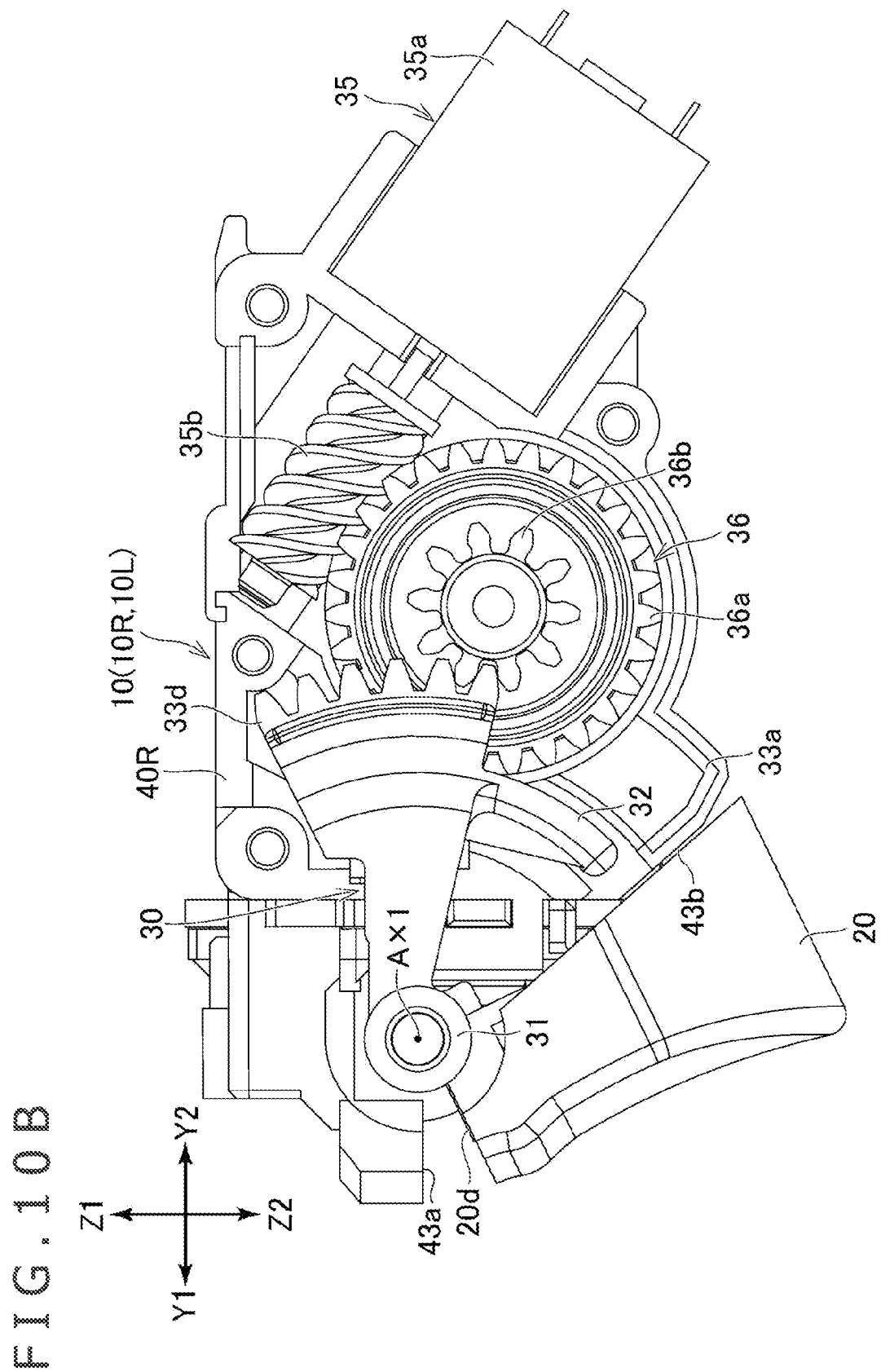
FIG. 10B is a side view illustrating the internal structure of the button driving unit with the right holder member removed therefrom. The operation button is disposed in a maximum push position, and the movable member is disposed in a standby position.

Each operation button 20 is permitted to move between an initial position (i.e., the position of the operation button 20 as illustrated in FIG. 10A) and a maximum push position (i.e., the position of the operation button 20 as illustrated in FIG. 10B), which is away rearward from the initial position, and moves from the initial position toward the maximum push position in response to receiving a pushing operation by the user. In the input device 100, the operation button 20 is a generally-called trigger button and is capable of moving in the front-rear direction around the axis Ax1 (see FIGS. 10A and 10B) positioned at an upper portion thereof. If a front surface of the operation button 20 receives a pushing operation by the user, the operation button 20 moves rearward around the axis Ax1. In other words, the operation button 20 is capable of moving in a direction along a plane perpendicular to the axis Ax1 (this plane corresponds to a "first plane" mentioned in the claims). As is not the case with the input device 100, the operation button 20 may be supported so as to be permitted to move parallel to the front-rear direction.

Figure 3:
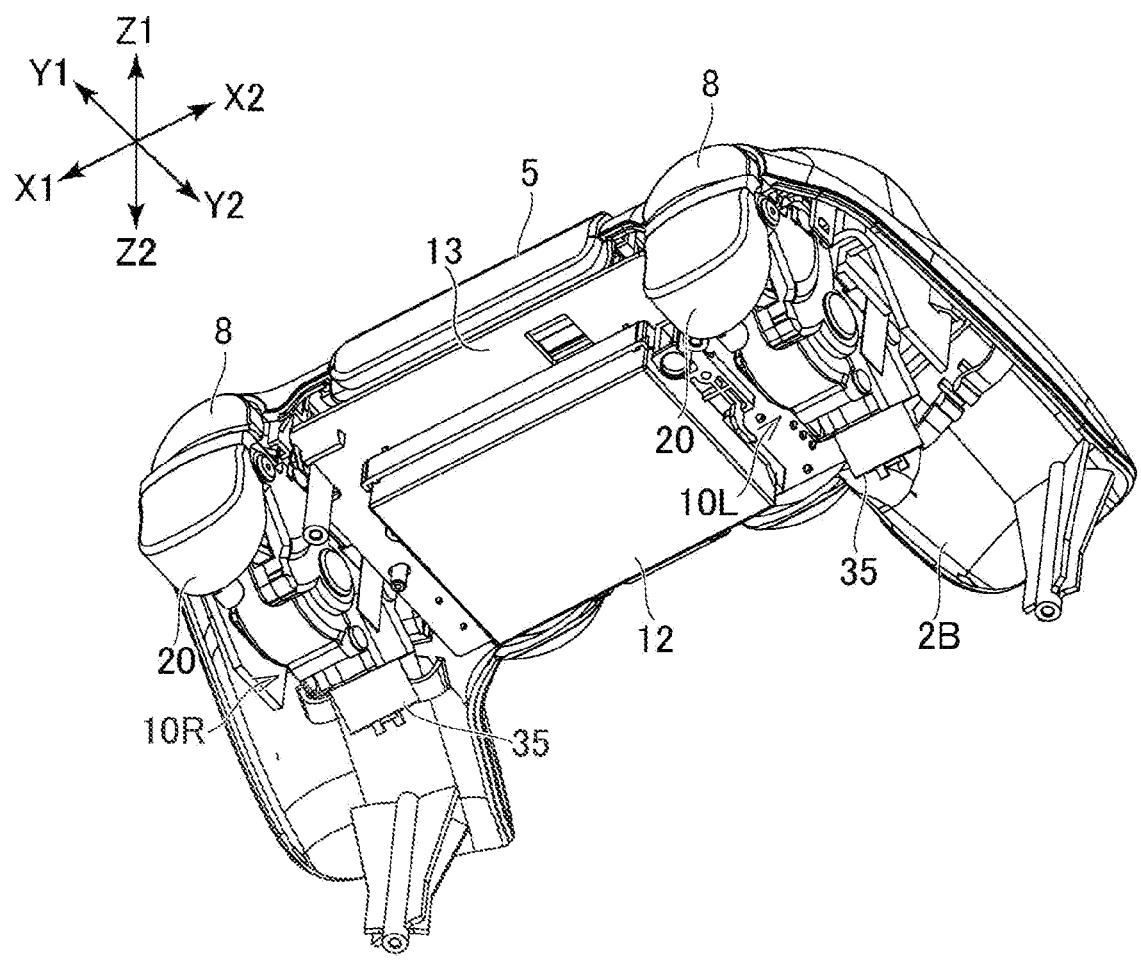
FIG. 3 is a perspective view illustrating the operation input device with a lower cabinet removed therefrom. In this figure, two button driving units are illustrated.

[Button driving unit] The input device 100 has a button driving unit 10R (see FIGS. 1 and 3) installed in a right part of the input device 100, and a button driving unit 10L (see FIGS. 1 and 3) installed in a left part of the input device 100. In the input device 100, the button driving units 10R and 10L are disposed below the operation members disposed on the upper surface of the input device 100. Specifically, the button driving unit 10L on the left side is disposed below the cross key 4 disposed on the left part of the upper surface of the input device 100, while the button driving unit 10R on the right side is disposed below the operation buttons 3a to 3d disposed on the right part of the upper surface of the input device 100. When features common to the two button driving units 10R and 10L are described in the following description, reference numeral "10" is assigned to the button driving unit.

The number of button driving units 10 is not limited to the example of the input device 100. For example, in the case of a stick-like operation input device capable of being operated with one hand, the number of operation buttons 20 (i.e., trigger buttons) and the number of button driving units 10 having them may be one.

Figure 9:
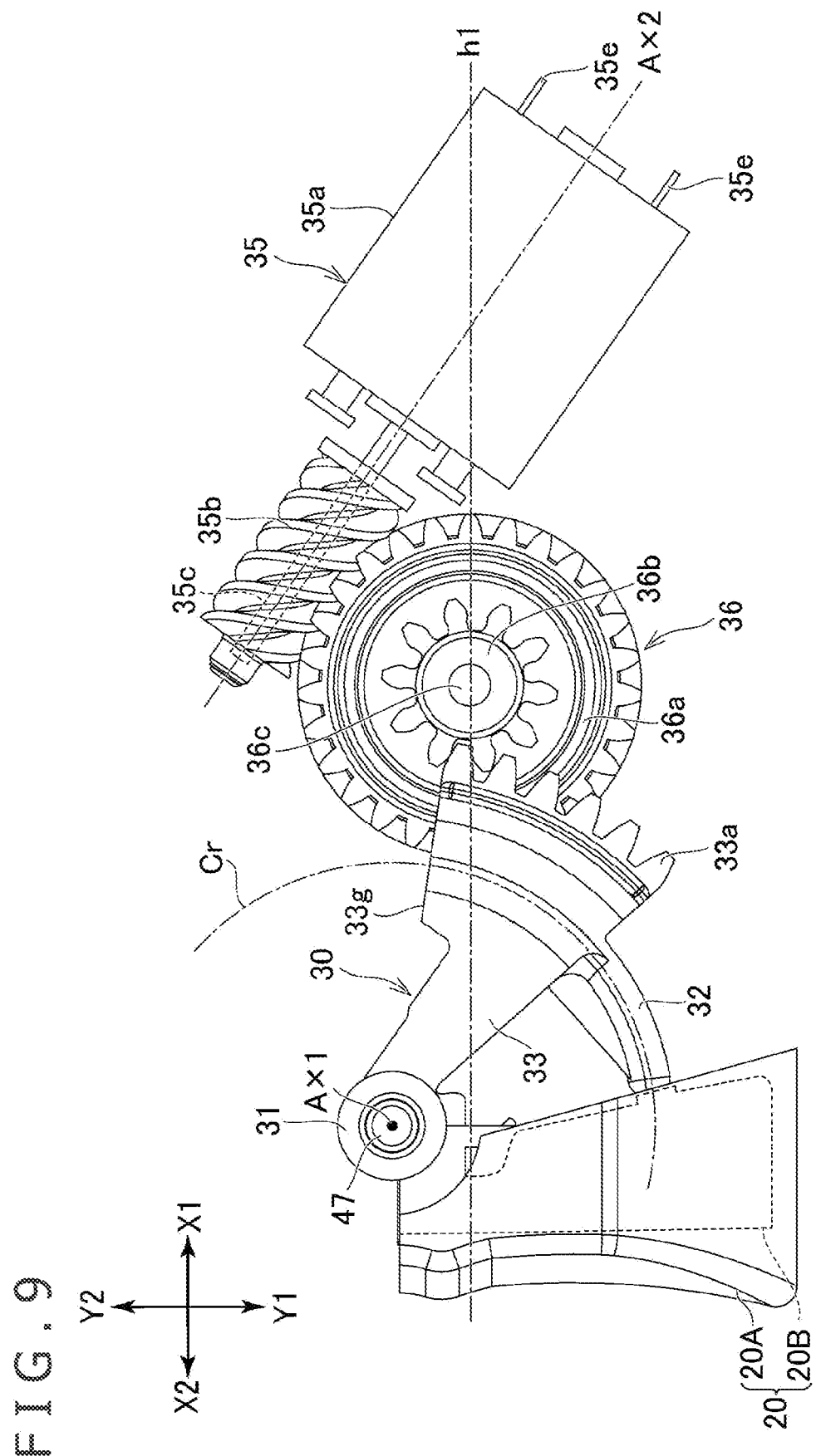
FIG. 9 is a side view illustrating the internal structure of the button driving unit.

As illustrated in FIG. 9, the button driving unit 10 has a movable member 30 disposed on the rearward side of the operation button 20, and an electric motor 35 for moving the movable member 30. The movable member 30 is capable of moving in a direction along a plane that crosses the left-right direction (more specifically, a plane perpendicular thereto). The movable member 30 pushes the operation button 20 toward the initial position in response to receiving power of the electric motor 35. The button driving unit 10 includes a transmission system M for transferring the power of the electric motor 35 to the movable member 30. The transmission system M has, for example, an intermediate gear 36 disposed between the movable member 30 and the electric motor 35.

The movable member 30 applies, to the operation button 20, a force acting in a direction opposite to a direction in which the user pushes the operation button 20. The input device 100 drives the electric motor 35 to move the movable member 30 in accordance with a signal (i.e., an instruction) received from the game machine. For example, when the user has pushed the operation button 20, the movable member 30 restricts the movement of the operation button 20 (in other words, the movable member 30 functions as a stopper against the movement of the operation button 20). This makes it possible to provide, to the user, a sense of a character operated by the user in a virtual space of a game having touched a hard object. In another example, when the user pushes the operation button 20, the movable member 30 may apply, to the operation button 20, a reaction force (i.e., a force acting in the direction opposite to the direction in which the user pushes the operation button 20) that matches the amount of movement (i.e., the amount of pushing) of the operation button 20. This makes it possible to provide a sense of a character operated by the user in a virtual space of a game having touched an elastic object. In yet another example, when the user pushes the operation button 20, the movable member 30 may cause the operation button 20 to vibrate in the front-rear direction.

The electric motor 35 is, for example, a stepping motor, a servomotor, or the like. The electric motor 35 may alternatively be a geared motor containing a reduction gear. A control device (i.e., a control device included in the input device 100, or the game machine) performs torque control, position control, and/or speed control with respect to the electric motor 35.

The button driving unit 10 has a holder 40. The holder 40 holds the electric motor 35. In addition, the holder 40 supports the operation buttons 20, the transmission system M, and the movable member 30 so as to permit movement thereof. This configuration enables an assembler of the input device 100 to treat each of the electric motor 35, the operation buttons 20, the transmission system M, and the movable member 30 as a unitary component, which may lead to improved workability in assembling.

Note that, in the input device 100, the operation members on which a reaction force due to the movable member 30 does not act, e.g., the operation buttons 8 (see FIG. 2) disposed above the operation buttons 20, are held by the cabinet 2. Alternatively, the operation members on which a reaction force due to the movable member 30 does not act, such as the operation buttons 8, may also be supported by the holder 40.

The holder 40 is fixed to, for example, the cabinet 2 using, for example, an engagement portion having a hook or a screw. The input device 100 may have a frame housed in the cabinet 2 and supporting a circuit board 13, the operation members 3a and 4a provided on the upper side of the input device 100, etc. The holder 40 may be fixed to the frame using, for example, an engagement portion having a hook or a screw.

Figure 5:
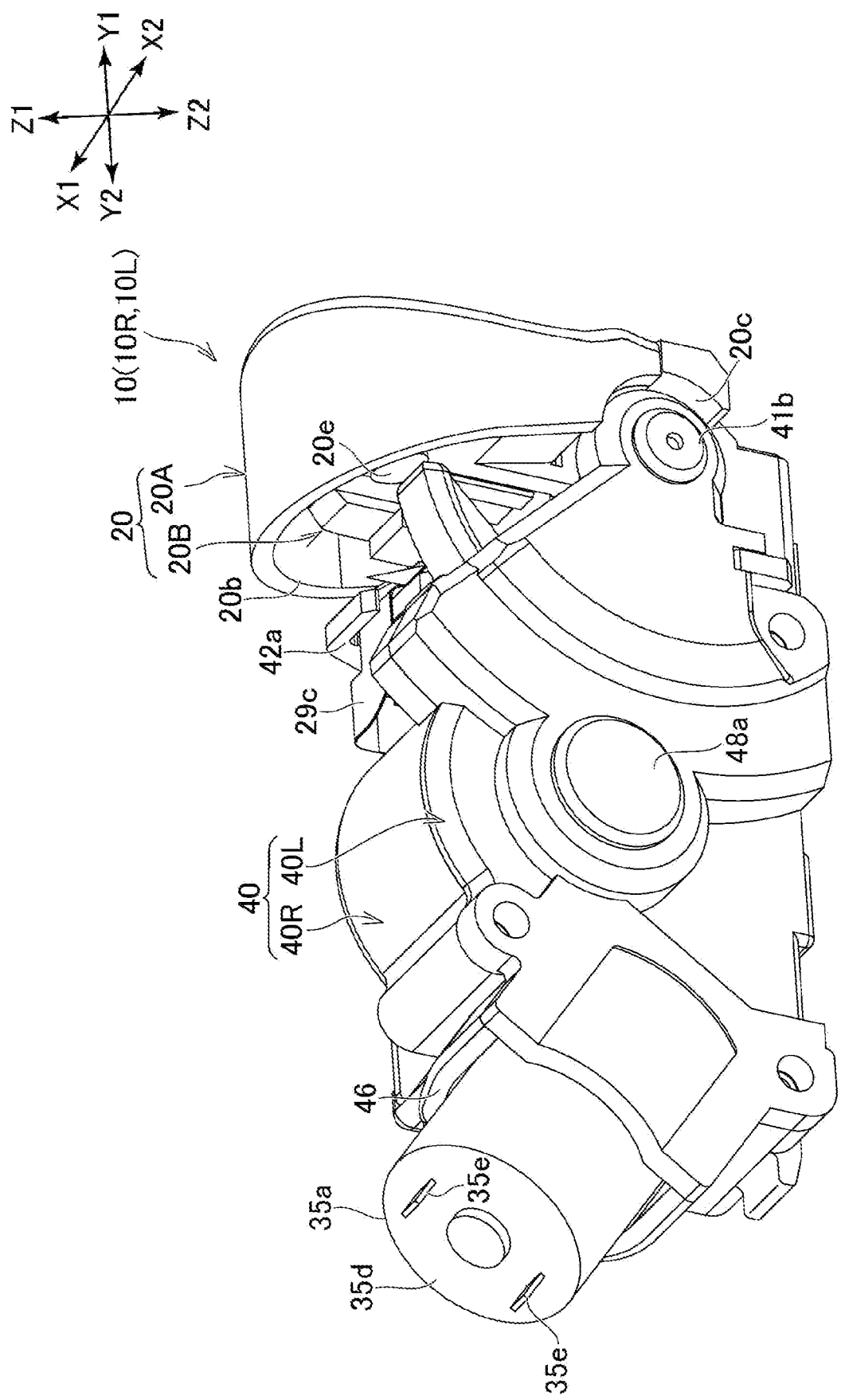
FIG. 5 is a perspective view of the button driving unit.
Figure 6:
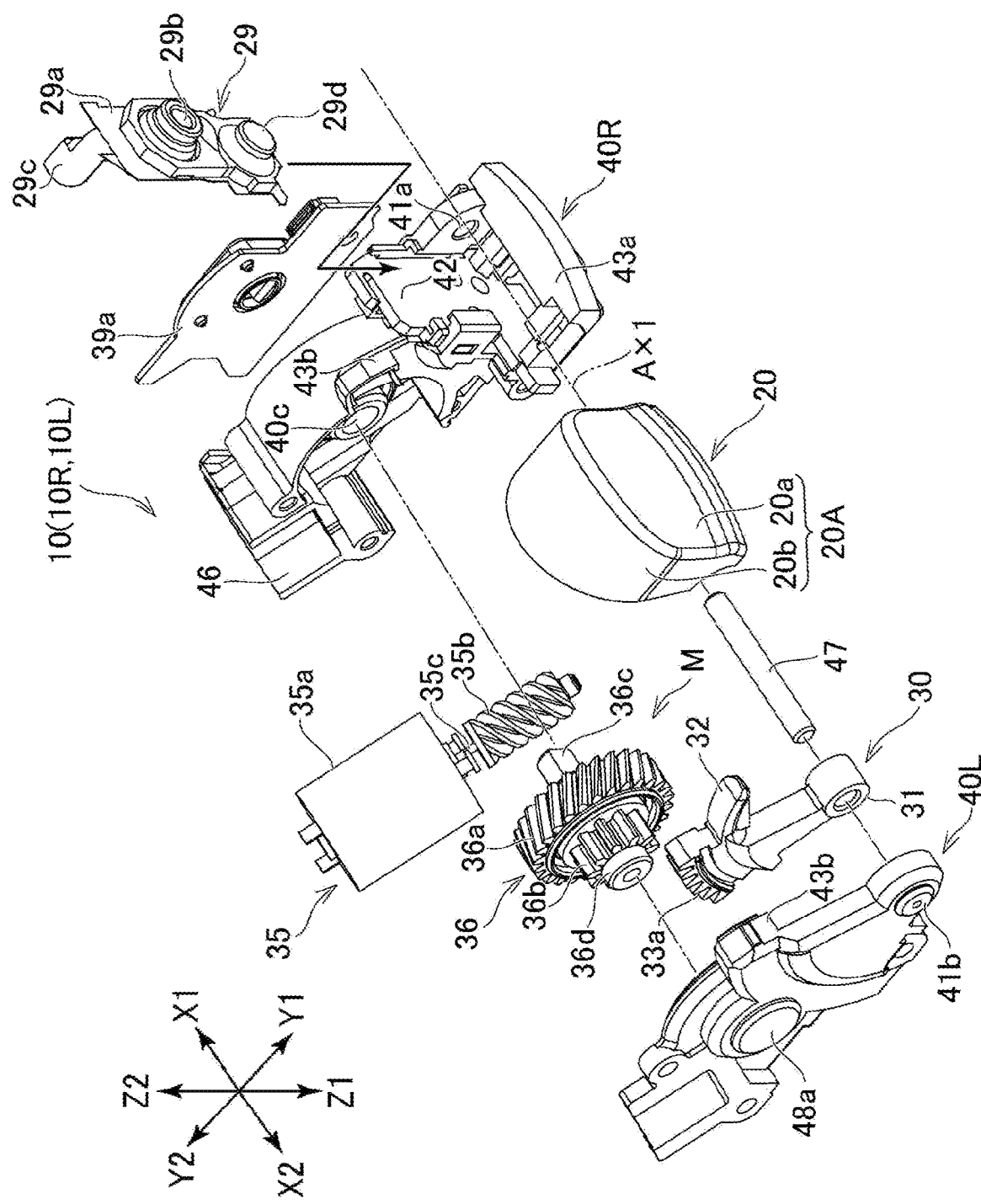
FIG. 6 is an exploded perspective view of the button driving unit.

As illustrated in FIGS. 5 and 6, the holder 40 includes a right holder member 40R and a left holder member 40L coupled to each other in the left-right direction. That is, the holder 40 includes the right holder member 40R and the left holder member 40L coupled to each other in a direction (i.e., the left-right direction) along the above-mentioned axis Ax1. A housing chamber to house the transmission system M is secured inside the right holder member 40R and the left holder member 40L. Constituent elements of the holder 40 are not limited to the two holder members 40R and 40L, but three or four members may be used to constitute the holder 40.

[Movement of and supporting structure for operation button] As illustrated in FIG. 6, the input device 100 has the support shaft 47 positioned on the axis Ax1 (see FIGS. 10A and 10). The operation button 20 is supported by the holder 40 through the support shaft 47, and is capable of moving along a circular arc Cr (see FIG. 9) centered on the support shaft 47. In the input device 100, the operation button 20 moves in the front-rear direction around the support shaft 47.

Figure 7:
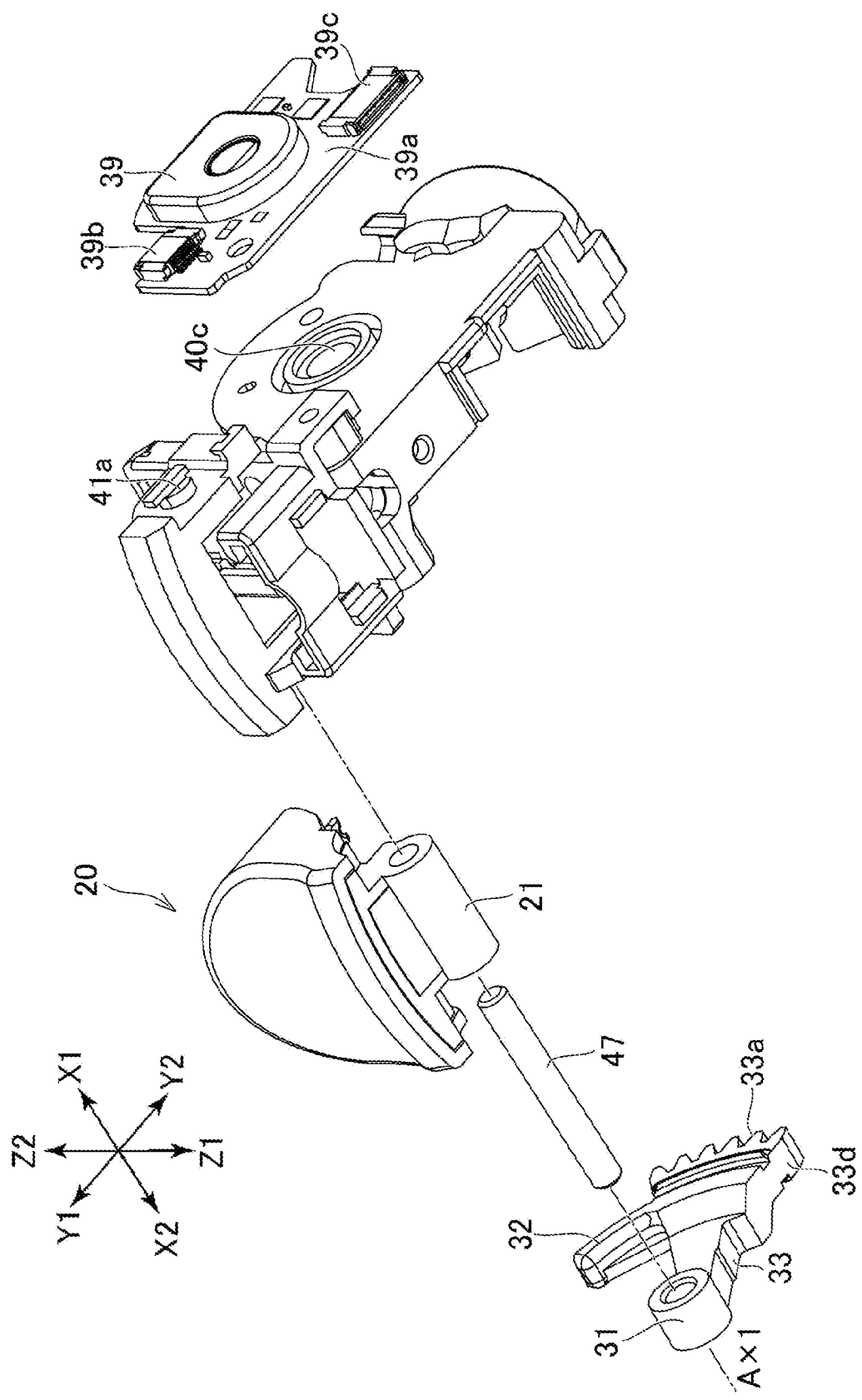
FIG. 7 is an exploded perspective view of the button driving unit. In this figure, a right holder member, an operation button, a movable member, and a support shaft are illustrated.

The support shaft 47 is supported by the holder 40. In more detail, as illustrated in FIG. 7, a tubular supported portion 21 is formed at the upper portion of the operation button 20, and the support shaft 47 is inserted inside the supported portion 21. The holder members 40R and 40L have shaft support portions 41a and 41b (see FIG. 6), respectively. The shaft support portions 41a and 41b hold a right part and a left part, respectively, of the support shaft 47 with the support shaft 47 being inserted in the supported portion 21.

Figure 4:
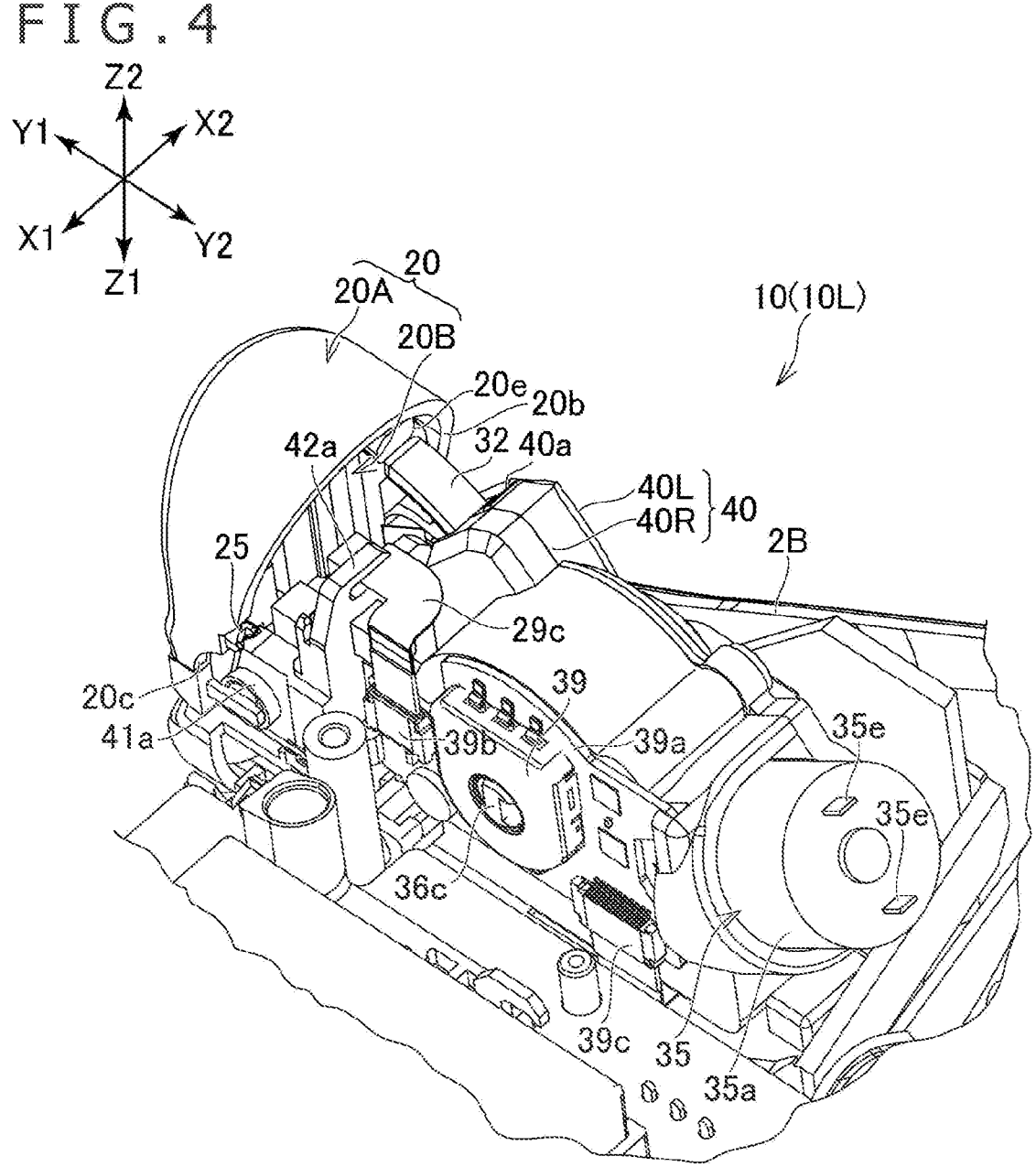
FIG. 4 is an enlarged perspective view illustrating a button driving unit.

In a front view of the operation button 20 (i.e., when the operation button 20 is viewed in the direction in which the operation button 20 is pushed), the shaft support portions 41a and 41b are hidden by the operation button 20. As illustrated in FIGS. 4 and 5, recessed portions 20c are defined in side portions of the operation button 20, and the shaft support portions 41a and 41b are positioned inside (i.e., on the rearward side of) the recessed portions 20c. This configuration is able to reduce the distance between the shaft support portions 41a and 41b on the right and left sides, and reduce the width of the holder 40 in the left-right direction. This facilitates layout of components inside the cabinet 2.

As illustrated in FIG. 9, the operation button 20 has an exterior portion 20A that forms the exterior of the operation button 20, and a body portion 20B provided inside the exterior portion 20A. In the input device 100, the exterior portion 20A and the body portion 20B are integrally molded of a resin, for example. That is, the body portion 20B and the exterior portion 20A may be formed of the resin in a common molding process. As is not the case with the input device 100, the body portion 20B may be formed separately from the exterior portion 20A, and be attached to the exterior portion 20A using an engagement portion having a hook or a screw. In this case, the supported portion 21 may be formed in the body portion 20B. This enables the assembler of the input device 100 to treat each of the electric motor 35, the body portion 20B of the operation button 20, the transmission system M, and the movable member 30 as a unitary component. In addition, the exterior portion 20A alone can be made replaceable according to preference of the user.

As illustrated in FIGS. 5 and 6, the exterior portion 20A has a pressed surface 20a facing forward of the input device 100 to receive a pushing operation by the user, and a lateral wall 20b extending rearward from an outer peripheral edge of the pressed surface 20a. The above-mentioned recessed portions 20c are defined in the lateral wall 20b. The shaft support portions 41a and 41b overlap with the pressed surface 20a in the front view of the operation button 20.

A supporting structure for the operation button 20 is not limited to the example of the input device 100. For example, the support shaft 47 may be formed integrally with the operation button 20. In this case, the support shaft 47 may be formed by protruding portions projecting from left and right side surfaces (for example, the lateral wall 20b) of the operation button 20. In another example, the support shaft 47 may be molded integrally with one or both of the right holder member 40R and the left holder member 40L. That is, one or both of the right holder member 40R and the left holder member 40L may have formed therein a protruding portion projecting inwardly of the holder 40, and this protruding portion(s) may function as the support shaft 47.

The movement of the operation button 20 also is not limited to the example of the input device 100. The operation button 20 may be supported so as to move, for example, in a straight line in a direction along a plane that crosses the left-right direction, instead of moving along the circular arc Cr centered on the support shaft 47.

The holder 40 has stoppers 43a and 43b that define a movable range of the operation button 20. As illustrated in FIGS. 6 and 10A, the stopper 43a is formed in, for example, the right holder member 40R. The stopper 43a abuts on the operation button 20 in the initial position to restrain the operation button 20 from moving beyond the initial position. The stopper 43a projects forward from the right holder member 40R, for example, to abut on an upper wall 20d (see FIG. 10A) of the operation button 20. As illustrated in FIGS. 6 and 10B, the stoppers 43b are formed in, for example, both of the right holder member 40R and the left holder member 40L. The stoppers 43b abut on the operation button 20 in the maximum push position to restrain the operation button 20 from moving beyond the maximum push position. The stoppers 43b abut on, for example, an edge of the lateral wall 20b of the operation button 20. The positions of the stoppers 43a and 43b are not limited to the examples of the input device 100. For example, the stopper 43a which defines the initial position may be formed in the cabinet 2 instead of the holder 40.

As illustrated in FIG. 4, the input device 100 has an elastic member 25 (for example, a spring) to push the operation button 20 toward the initial position. When in the initial position, the operation button 20 is pressed against the stopper 43a by receiving an elastic force of the elastic member 25. The elastic member 25 is also attached to the holder 40. The elastic member 25 is also attached to the right holder member 40R, for example.

[Sensor] A sensor 29 (see FIG. 6) to sense the pushing operation by the user is disposed on the rearward side of the operation button 20. The sensor 29 is, for example, a sensor capable of sensing the amount of pushing of the operation button 20 (i.e., the amount of movement of the operation button 20). The sensor 29 has, for example, a sensor board 29a having a resistor formed therein, and an electrically conductive rubber 29b disposed on the forward side of the resistor. The electrically conductive rubber 29b is pressed by the operation button 20. The area of contact between the electrically conductive rubber 29b and the resistor changes in accordance with the amount of pushing, and the resistance value of the resistor changes in accordance with the change in the area of contact. Accordingly, the amount of pushing of the operation button 20 can be sensed on the basis of the resistance value, in more detail, on the basis of a voltage acting on the resistor. As described above, the operation button 20 has the exterior portion 20A and the body portion 20B. The body portion 20B is positioned on the forward side of the sensor 29, and when the operation button 20 has received a pushing operation by the user with the pressed surface 20a, the body portion 20B pushes the sensor 29. Note that the type of the sensor 29 is not limited to the type of sensor using the electrically conductive rubber 29b. Also note that, in place of the sensor 29, a sensor (e.g., an ON/OFF switch) to sense ON/OFF of the operation on the operation button 20 may be disposed on the rearward side of the operation button 20.

The sensor 29 is attached to the holder 40. Accordingly, the assembler of the input device 100 is able to treat each of the electric motor 35, the operation button 20, the transmission system M, the movable member 30, and the sensor 29 as a unitary component, which may lead to an additional improvement in workability in assembling. In addition, this configuration is able to prevent a displacement in relative positions of the sensor 29 and the operation button 20. As illustrated in FIG. 6, the holder 40 has a mounting wall 42 positioned on the rearward side of the operation button 20, and facing forward. The sensor board 29a is mounted on a forward side of the mounting wall 42. The disposition of and a supporting structure for the sensor 29 are not limited to the examples of the input device 100.

Each operation button 8 (see FIG. 2) may also be attached to the holder 40. For example, the operation button 8 may be attached to the holder member 40R, i.e., one of the holder members, so as to be capable of moving forward and rearward with respect to the holder member 40R. An operation on the operation button 8 may be sensed by the sensor 29. For example, a switch 29d to be pressed by the operation button 8 may be provided on the sensor board 29a.

One of the two holder members 40R and 40L has a greater width in the left-right direction (i.e., the direction along the axis Ax1) than the other holder member. In the input device 100, the width of the right holder member 40R in the left-right direction is greater than the width of the left holder member 40L in the left-right direction as illustrated in FIG. 6. Then, the sensor 29 is attached to the right holder member 40R. That is, the mounting wall 42 is formed in the right holder member 40R. Thus, the width of the holder member 40R, i.e., one of the holder members, is increased to make it easier to attach the sensor 29 to the holder member 40R.

As illustrated in FIG. 6, the above-mentioned shaft support portion 41a projects forward from the mounting wall 42. In addition, as illustrated in FIG. 4, a clamping portion 42a to fasten a cable 29c extending from the sensor board 29a may be formed in an upper portion of the mounting wall 42.

[Movement of and supporting structure for movable member] The movable member 30 is capable of moving in a direction along the plane perpendicular to the left-right direction. The holder 40 supports the movable member 30 so as to permit movement of the movable member 30. For example, the movable member 30 is capable of moving around the axis Ax1 or a straight line parallel to the axis Ax1.

In the input device 100, both of the operation button 20 and the movable member 30 are capable of moving around the support shaft 47 (i.e., the axis Ax1), and the holder 40 supports the operation button 20 and the movable member 30 through the support shaft 47. As illustrated in FIG. 6, the movable member 30 has a supported portion 31 positioned on the axis Ax1. The supported portion 31 is, for example, annular, and the support shaft 47 is inserted inside the supported portion 31. The supported portion 21 of the operation button 20 and the supported portion 31 of the movable member 30 are positioned between the shaft support portion 41b of the right holder member 40R and the shaft support portion 41a of the left holder member 40L. The shaft support portions 41a and 41b support both end portions of the support shaft 47.

As illustrated in FIG. 9, the movable member 30 is disposed on the rearward side of the operation button 20. The movable member 30 has a projecting portion 32 extending toward the operation button 20. An end portion of the projecting portion 32 abuts on the rearward side of the operation button 20. A receiving surface 20e (see FIG. 5) is defined in the operation button 20 (in more detail, the body portion 20B), and the end portion of the projecting portion 32 abuts on the receiving surface 20e. The receiving surface 20e is away from the axis Ax1 in a radial direction.

The configuration in which both of the operation button 20 and the movable member 30 move around the shared support shaft 47 is able to prevent wear between the operation button 20 and the movable member 30. That is, when the operation button 20 and the movable member 30 have moved with the projecting portion 32 pushing the receiving surface 20e, relative positions of the end portion of the projecting portion 32 and the receiving surface 20e do not change. Thus, wear of the end portion of the projecting portion 32 and the receiving surface 20e due to long-term use of the input device 100 can be prevented.

The position of the movable member 30 in the left-right direction is displaced from a center of the operation button 20 in the left-right direction. As illustrated in FIG. 5, the position of the movable member 30 is displaced, for example, leftward (i.e., in the direction indicated by "X2") with respect to the center of the operation button 20. The position of the receiving surface 20e is also displaced from the center of the operation button 20. This arrangement of the movable member 30 makes it easier to secure a space to accommodate another component right behind the operation button 20. The above-mentioned sensor 29, for example, is disposed on the rearward side of the operation button 20.

The position of the supported portion 31 of the movable member 30 is also displaced from the center of the operation button 20 in the left-right direction, and as illustrated in FIG. 7, the supported portion 31 and the supported portion 21 of the operation button 20 are arranged side by side in the left-right direction. The width of the supported portion 21 in the left-right direction is smaller than the width of the exterior portion 20A of the operation button 20 in the left-right direction.

The positions of the supported portion 31 and the supported portion 21 in the left-right direction are between the right side surface (i.e., a right side surface of the lateral wall 20b) of the operation button 20 and the left side surface (i.e., a left side surface of the lateral wall 20b) of the operation button 20. This configuration contributes to reducing the width of the button driving unit 10 in the left-right direction, i.e., the width of the holder 40 in the left-right direction. This in turn facilitates the layout of the components inside the cabinet 2. As is not the case with the example of the input device 100, the positions of the supported portions 21 and 31 may partially protrude rightward or leftward beyond the position of one of the right side surface and the left side surface of the exterior portion 20A.

The disposition of the movable member 30 is not limited to the example of the input device 100. For example, the position of the movable member 30 in the left-right direction may correspond with the position of the center of the operation button 20 in the left-right direction.

The input device 100 has the button driving units 10R and 10L in the right part and the left part, respectively, thereof. The two button driving units 10R and 10L have substantially the same structure, instead of being symmetrical in structure. Accordingly, in each of the two button driving units 10R and 10L, the movable member 30 is displaced in the same direction (for example, leftward) from the center of the operation button 20. This configuration makes it possible to share components between the two button driving units 10R and 10L, which leads to a reduction in production cost of the button driving units 10R and 10L. Note that a sign indicating the type or function of a button may be printed on the exterior portion 20A of the operation button 20. In this case, the right and left button driving units 10R and 10L may differ in this sign. In other words, the right and left button driving units 10R and 10L may have the same structure with respect to the components except the operation button 20.

The supporting structure for the movable member 30 is not limited to the example of the input device 100. For example, the support shaft 47 may be formed integrally with the movable member 30. That is, the movable member 30 may have formed therein protruding portions projecting rightward and leftward therefrom, and these protruding portions may be used as the support shaft 47. In yet another example, the holder 40 may have a guide to guide the direction in which the movable member 30 moves, and the movable member 30 may be supported by the guide instead of by the support shaft 47.

In yet another example, the movable member 30 may be supported by a support shaft different from the support shaft 47. In this case, the support shaft 47 that supports the operation button 20 and the support shaft that supports the movable member 30 may be disposed in parallel and be supported by the holder 40. In this case also, the operation button 20 and the movable member 30 move in a direction along the plane perpendicular to the axis Ax1.

It is desirable that the support shaft that supports the movable member 30 be positioned on the inner side of a locus (i.e., the circular arc Cr, see FIG. 9) of the operation button 20. In other words, it is desirable that the support shaft 47 and the support shaft that supports the movable member 30 be positioned on the same side of the circular arc Cr. This configuration contributes to reducing a change in relative positions of the projecting portion 32 and the receiving surface 20e when the operation button 20 and the movable member 30 have moved with the projecting portion 32 of the movable member 30 pushing the receiving surface 20e of the operation button 20. This in turn contributes to preventing wear thereof.

In yet another example, the movable member 30 may be supported so as to move, for example, in a straight line in a direction along the plane perpendicular to the left-right direction, instead of moving along the circular arc. In this case, the holder 40 may have formed therein a guide to guide the direction in which the movable member 30 moves. Specifically, it is desirable that the movable member 30 move in a direction that matches a locus (i.e., the circular arc Cr, see FIG. 9) of the receiving surface 20e of the operation button 20. This will contribute to reducing a change in relative positions of the end portion of the projecting portion 32 and the receiving surface 20e when the operation button 20 and the movable member 30 have moved with the projecting portion 32 of the movable member 30 pushing the receiving surface 20e of the operation button 20, and preventing wear thereof. Here, the direction that matches the locus of the receiving surface 20e is, for example, a direction of a tangent to the circular arc Cr, which is the locus of the receiving surface 20e.

Figure 8:
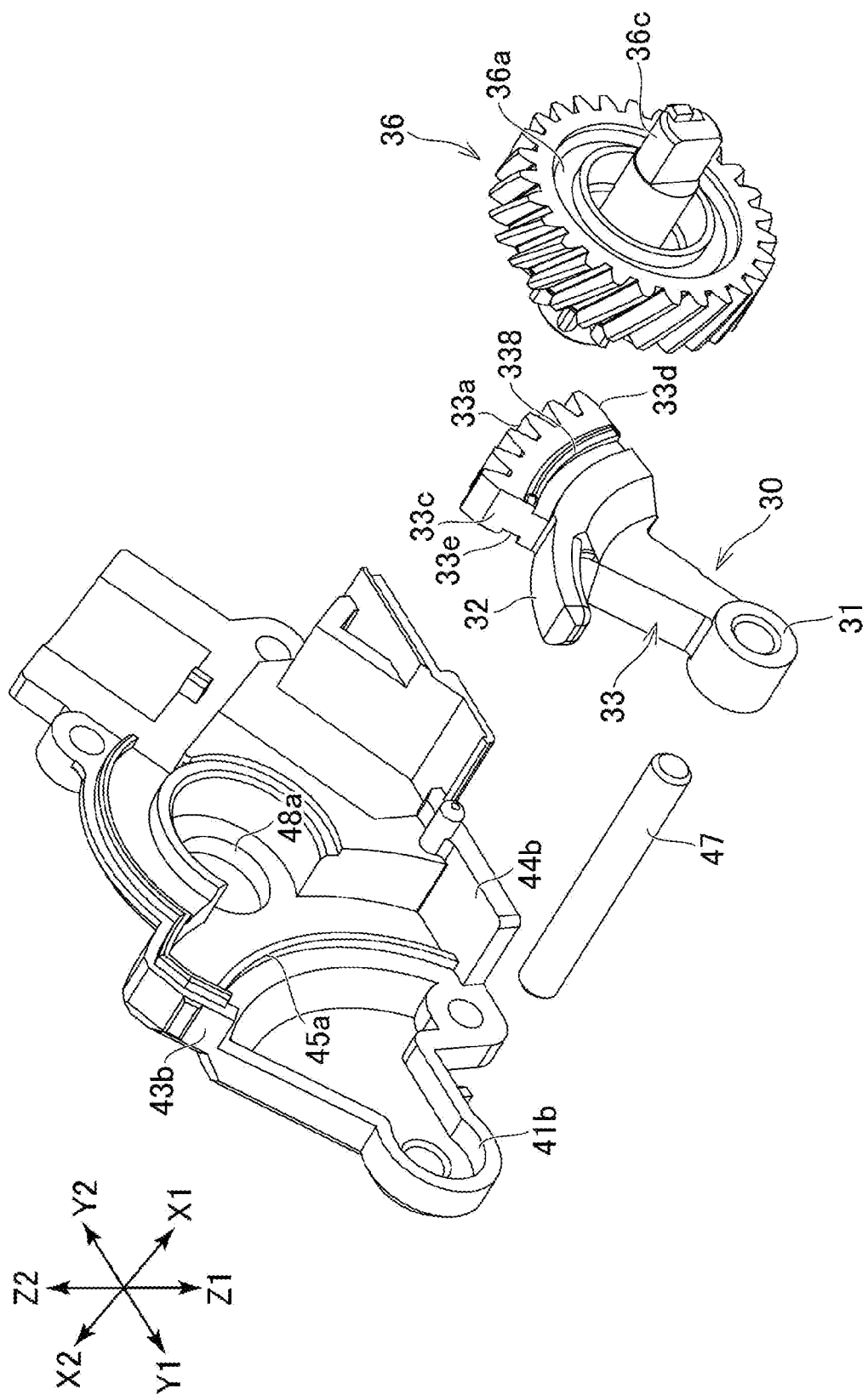
FIG. 8 is an exploded perspective view of the button driving unit. In this figure, a left holder member, the support shaft, the movable member, and an intermediate gear are illustrated.

As illustrated in FIG. 8, the movable member 30 has a body portion 33 extending in a radial direction of the support shaft 47 from the supported portion 31, and the projecting portion 32 extending from the body portion 33 toward the receiving surface 20e of the operation button 20. The body portion 33 has formed therein a gear portion 33a in the shape of a circular arc and engaged with the intermediate gear 36 as described below.

The movable member 30 is capable of moving between the most forward position (see FIG. 10A) and a standby position (see FIG. 10B). When in the most forward position, the movable member 30 abuts on the receiving surface 20e of the operation button 20 in the initial position (see FIG. 10A). When in the standby position, the movable member 30 is apart from the receiving surface 20e of the operation button 20 in the maximum push position (see FIG. 10B). Defining the standby position thus makes it possible to cause the movable member 30 to strike against the operation button 20 after the movable member 30 is accelerated by the electric motor 35, when the operation button 20 is in the maximum push position. This in turn makes it possible to increase an impact on the operation button 20, thus providing the user with this impact as a tactile sensation.

Note that the movable range of the movable member 30 is not limited to the example of the input device 100. For example, when in the standby position, the movable member 30 may abut on the receiving surface 20e of the operation button 20 in the maximum push position.

The holder 40 has stoppers 44a and 44b that define the movable range of the movable member 30. As illustrated in FIG. 10A, the stopper 44a abuts on the movable member 30 in the most forward position to restrain the movable member 30 from moving beyond the most forward position. When the movable member 30 is in the most forward position, the stopper 44a abuts on, for example, a forward end surface 33c of the body portion 33 (e.g., a forward end surface of the gear portion 33a). Meanwhile, as illustrated in FIG. 10B, the stopper 44b (see FIG. 8) abuts on the movable member 30 in the standby position to restrain the movable member 30 from moving beyond the standby position. When the movable member 30 is in the standby position, the stopper 44b abuts on, for example, an upper end 33d (see FIGS. 8 and 10B) of the gear portion 33a of the body portion 33.

The holder 40 may have formed therein a guide 45a to guide the direction in which the movable member 30 moves. As illustrated in FIG. 8, a protruding portion in the shape of a circular arc, for example, may be formed as the guide 45a on an inner surface of the left holder member 40L. In this case, a guide groove 33e into which the guide 45a is fitted may be formed in a side surface of the movable member 30. In the example illustrated in the figure, a guide 33f, which is a protruding portion in the shape of a circular arc, is formed on a side surface of the movable member 30 on an opposite side. A guide groove into which the guide 33f is fitted may be formed in an inner surface of the right holder member 40R.

[Disposition of electric motor] As illustrated in FIG. 9, the electric motor 35 is disposed, for example, on the rearward side of the operation button 20. The electric motor 35 has a rotating shaft 35c having a gear 35b attached thereto. In addition, the electric motor 35 has a body portion 35a containing a stator and a rotor. The rotor is capable of rotating relative to the stator, and rotates together with the rotating shaft.

The electric motor 35 is disposed such that the rotating shaft 35c extends along a plane that crosses the axis Ax1 (more specifically, a plane perpendicular thereto). That is, the electric motor 35 is disposed such that the rotating shaft 35c extends parallel to the plane perpendicular to the axis Ax1.

In a plan view of the button driving unit 10, the rotating shaft 35c and the body portion 35a of the electric motor 35 are arranged in the front-rear direction. This posture of the electric motor 35 enables installation of the button driving units 10 using spaces in the grip portions GR and GL (see FIG. 1) of the input device 100. A battery 12 and the circuit board 13, for example, are disposed between the right and left button driving units 10R and 10L (see FIG. 3). The above-described disposition of the electric motors 35 leads to an increase in the width of the battery 12 in the left-right direction, and ensuring sufficient capacity of the battery 12.

As illustrated in FIG. 9, the gear 35b of the electric motor 35 is disposed on the upper side of the intermediate gear 36 described below. The electric motor 35 is disposed such that, in a side view of the button driving unit 10, an axis Ax2 of the rotating shaft 35c is at an angle with respect to a horizontal plane hl. That is, the axis Ax2 of the electric motor 35 is inclined with respect to the horizontal plane hl, and extends rearward and downward.

As illustrated in FIG. 9, the body portion 35a of the electric motor 35 is positioned on the rearward side of the intermediate gear 36. The intermediate gear 36 is positioned on the rearward side of the movable member 30. That is, the movable member 30, the intermediate gear 36, and the body portion 35a are arranged in a direction perpendicular to the axis Ax1. This arrangement facilitates the layout of the components inside the cabinet 2 of the input device 100.

As described above, the electric motor 35 is held by the holder 40. As illustrated in FIG. 6, the holder 40 has a motor holder portion 46 that holds the electric motor 35. The motor holder portion 46 covers only a part of the body portion 35a of the electric motor 35, leaving a rest of the body portion 35a exposed from the holder 40 (see FIG. 5). In more detail, as illustrated in FIG. 5, the motor holder portion 46 covers an outer circumferential surface of a forward portion (i.e., a half on a side on which the rotating shaft lies) of the body portion 35a. A rearward portion of the body portion 35a projects rearward from the holder 40, and an outer circumferential surface of the rearward portion is exposed from the holder 40. This configuration contributes to preventing heat from accumulating in the body portion 35a. As illustrated in FIG. 5, a rear end surface of the body portion 35a has terminals 35e and is exposed from the holder 40.

The disposition of the electric motor 35 is not limited to the example of the input device 100. For example, the gear 35b of the electric motor 35 may be positioned on the lower side of the intermediate gear 36, with the axis Ax2 extending rearward and upward. In yet another example, the electric motor 35 may be disposed such that the axis Ax2 thereof extends parallel to the support shaft 47.

[Transmission system] As illustrated in FIG. 6, the transmission system M has the intermediate gear 36. The intermediate gear 36 has a large-diameter gear portion 36a and a small-diameter gear portion 36b. The large-diameter gear portion 36a has a diameter greater than that of the small-diameter gear portion 36b. The rotating shaft 35c of the electric motor 35 has attached thereto the gear 35b engaged with the large-diameter gear portion 36a. The gear 35b is a screw gear (worm), and the large-diameter gear portion 36a is a helical gear (worm wheel). The movable member 30 has the gear portion 33a (rack) formed therein. The small-diameter gear portion 36b of the intermediate gear 36 is engaged with the gear portion 33a.

The transmission system M includes the gear 35b of the electric motor 35, the intermediate gear 36, and the gear portion 33a of the movable member 30, and receives rotation of the electric motor 35 and transfers this rotation to the movable member 30 while reducing the speed thereof. In addition, the transmission system M includes worm gears (i.e., the gears 35b and 36a), and converts the rotation of the electric motor 35 around the axis Ax2 along the front-rear direction in a plan view to rotation of the movable member 30 around the axis Ax1 along the left-right direction. Moreover, the inclusion of the worm gears (i.e., the gears 35b and 36a) in the transmission system M contributes to preventing a pushing force applied by the user when the operation button 20 is pushed by the user from rotating the electric motor 35.

The transmission system M is also supported by the holder 40. In more detail, the intermediate gear 36 is supported by the holder 40. As illustrated in FIG. 6, the intermediate gear 36 has support shafts 36c and 36d, and is capable of rotating around the support shafts 36c and 36d. The support shafts 36c and 36d extend rightward and leftward, respectively, and are each parallel to the support shaft 47. The holder 40 supports the support shafts 36*c* and 36*d* so as to permit rotation thereof. This configuration enables the assembler of the input device 100 to treat each of the electric motor 35, the operation button 20, the transmission system M (i.e., the intermediate gear 36), and the movable member 30 as a unitary component, which may lead to improved workability in assembling. As illustrated in FIG. 9, the support shafts 36*c* and 36*d* are positioned on the rearward side of the support shaft 47. The horizontal plane hl which passes through the support shafts 36*c* and 36*d* crosses the operation button 20.

An end portion (specifically, a left end portion) of the support shaft 36*d* is supported by a shaft support portion 48*a* (see FIG. 8) formed in the left holder member 40L. Meanwhile, the right holder member 40R has defined therein an opening 40*c* (see FIG. 6) into which an end portion (specifically, a right end portion) of the support shaft 36*c* is inserted. A sensor 39 (see FIG. 7) is attached to the right holder member 40R, and the end portion of the support shaft 36*c* is held by the sensor 39. Similarly to the left holder member 40L, the right holder member 40R may have formed therein a shaft support portion to hold the end portion of the support shaft 36*c*.

The holder 40 houses the intermediate gear 36, the body portion 33 of the movable member 30, and the gear 35*b* of the electric motor 35. The gear portions 36*a* and 36*b* of the intermediate gear 36, the gear portion 33*a* of the movable member 30, and the gear 35*b* of the electric motor 35 are not exposed to an outside of the holder 40. The projecting portion 32 of the movable member 30 projects toward the operation button 20 through an opening 40*a* (see FIG. 4) having a size that matches the thickness of the projecting portion 32 and defined in the holder 40. This configuration contributes to preventing an extraneous object from entering into a gap between the small-diameter gear portion 36*b* and the gear portion 33*a* of the movable member 30, or a gap between the large-diameter gear portion 36*a* and the gear 35*b* of the electric motor 35.

Note that the configuration of the holder 40 is not limited to the example of the input device 100. The holder 40 may leave a part of the intermediate gear 36 exposed to the outside of the holder 40 while supporting the intermediate gear 36 and the support shaft 47.

Also note that the configuration of the transmission system M is not limited to the example of the input device 100. For example, the transmission system M may not have the worm gears (35*b* and 36*a*). In this case, the intermediate gear 36 may intervene between the gear 35*b* of the electric motor 35 and the gear portion 33*a* of the movable member 30, or alternatively, the gear 35*b* of the electric motor 35 and the gear portion 33*a* of the movable member 30 may be directly engaged with each other.

[Sensor] As illustrated in FIG. 7, the button driving unit 10 has the sensor 39 to sense the position of the movable member 30. The sensor 39 is attached to a member positioned downstream of the gear 35*b* of the electric motor 35 in a path along which the power of the electric motor 35 is transferred. In the input device 100, the sensor 39 is attached to the support shaft 36*c* of the intermediate gear 36. The sensor 39 is, for example, a potentiometer capable of sensing the rotational position of the support shaft 36*c* of the intermediate gear 36, or an encoder capable of sensing the rotation of the support shaft 36*c*.

The sensor 39 is also attached to the holder 40. In more detail, as illustrated in FIG. 7, the sensor 39 is mounted on a board 39*a*, and the board 39*a* is attached to a right side surface of the right holder member 40R. Accordingly, the assembler of the input device 100 is able to treat each of the electric motor 35, the operation button 20, the transmission system M, the movable member 30, and the sensor 39 as a unitary component.

As described above, the sensor 29 for sensing an operation on the operation button 20 is also attached to the right holder member 40R. In addition, the right holder member 40R has a width greater than that of the left holder member 40L in the left-right direction. This configuration enables an assembly operation of attaching the sensors 39 and 29 to the right holder member 40R, thereafter attaching the operation button 20, the electric motor 35, etc., to the right holder member 40R, and attaching the intermediate gear 36 to the right holder member 40R while fitting the rotational position of the intermediate gear 36 to the sensor 39. Finally, the right holder member 40R and the left holder member 40L are coupled to each other.

As illustrated in FIG. 4, the cable 29*c* which extends from the sensor 29 to sense the movement of the operation button 20 is connected to a connector 39*b* mounted on the board 39*a*. In addition, a connector 39*c* is connected to the board 39*a*. The board 39*a* has formed therein a conductor line that electrically connects a terminal of the connector 39*c* and a terminal of the connector 39*b*, and a conductor line that electrically connects the sensor 39 and the connector 39*c*. A sensing signal obtained by the sensor 29 and a sensing signal obtained by the sensor 39 are each inputted to the control device (not illustrated) of the input device 100 through a cable (not illustrated) connected to the connector 39*c*, for example. This connection configuration leads to improved workability in an operation of connecting the cables.

The position of the sensor 39 is not limited to the example of the button driving unit 10. The button driving unit 10 may have a sensor attached to the movable member 30.

[Summary] As described above, the input device 100 has the operation button 20 which is capable of moving from the initial position in a direction along a plane that crosses the left-right direction (more specifically, the plane perpendicular thereto) when having received a pushing operation by the user, the movable member 30 which is capable of moving in a direction along this plane and capable of pushing the operation button 20 toward the initial position, and the electric motor 35 which moves the movable member 30. In addition, the input device 100 has the holder 40 holding the electric motor 35. The holder 40 supports the operation button 20 and the movable member 30 so as to permit the movement of the operation button 20 and the movable member 30. The input device 100 is able to achieve improved workability in an operation of assembling the input device 100.

In addition, the operation button 20 has the exterior portion 20A and the body portion 20B, and is capable of moving from the initial position in a direction along the plane perpendicular to the left-right direction when having received a pushing operation by the user. The button driving unit 10 has the body portion 20B, the movable member 30 which is capable of moving in a direction along the plane perpendicular to the left-right direction and is capable of striking against the body portion 20B to push the operation button 20 toward the initial position, the electric motor 35 which moves the movable member 30, and the holder 40 holding the electric motor 35. The holder 40 supports the body portion 20B and the movable member 30 so as to permit the movement of the operation button 20 and the movable member 30. The button driving unit 10 is able to achieve improved workability in the operation of assembling the input device 100.

EXAMPLE MODIFICATIONS

Note that operation input devices proposed in the present disclosure are not limited to the input device 100 described above, and that various modifications may be made thereto.

For example, the operation button 20 may be provided on a lower surface or the upper surface of the input device 100. In this case, the operation button 20 may move in the up-down direction around an axis or may move in a direction at an angle with respect to both the up-down direction and the front-rear direction.

The holder 40 may have a motor bracket to which the electric motor 35 is attached, in addition to the right holder member 40R and the left holder member 40L. FIGS. 11A to 11D are diagrams illustrating a button driving unit 210 as an example button driving unit having such a structure. The following description is provided with a focus placed on differences from the button driving unit 10. Concerning features that are not described with respect to the button driving unit 210, the button driving unit 210 may be similar in structure to the button driving unit 10.

As illustrated in FIG. 11A, in the button driving unit 210, a holder has a motor bracket 241 to which an electric motor 35 is attached, in addition to a right holder member 240R and a left holder member 240L. The motor bracket 241 is a member formed separately from the holder members 240R and 240L. That is, the motor bracket 241 is formed using a mold separate from a mold used in a process of molding the holder members 240R and 240L. This configuration enables a working process of attaching the electric motor 35 to the motor bracket 241, and thereafter attaching the motor bracket 241 to the holder members 240R and 240L. This simplifies an operation of attaching the electric motor 35. The motor bracket 24 may be made of a material either the same as that of the holder members 240R and 240L, or different from that of the holder members 240R and 240L.

Figure 11B:
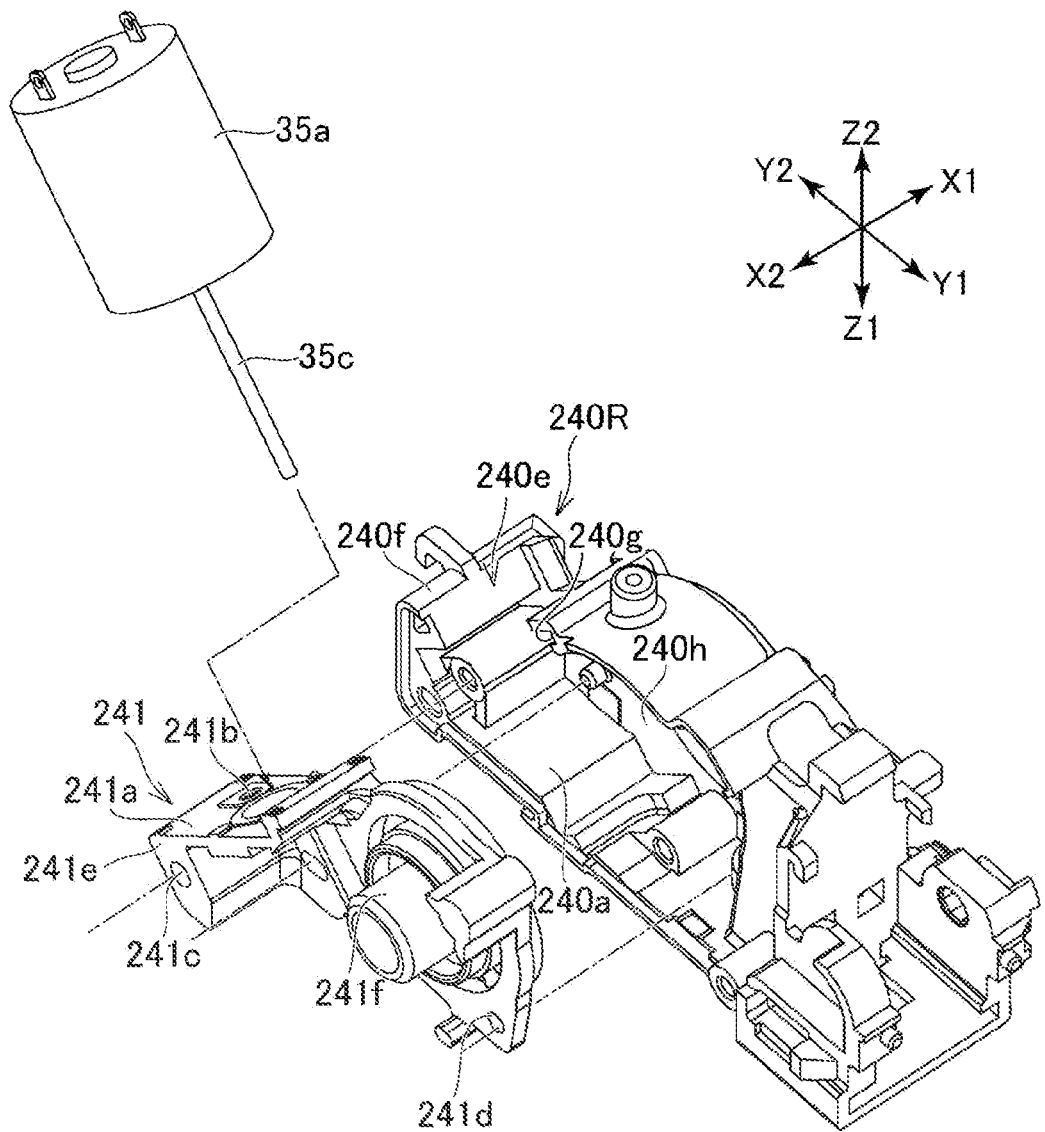
FIG. 11B is an exploded perspective view illustrating a holder member, a motor bracket, and an electric motor included in the button driving unit illustrated in FIG. 11A.
Figure 11C:
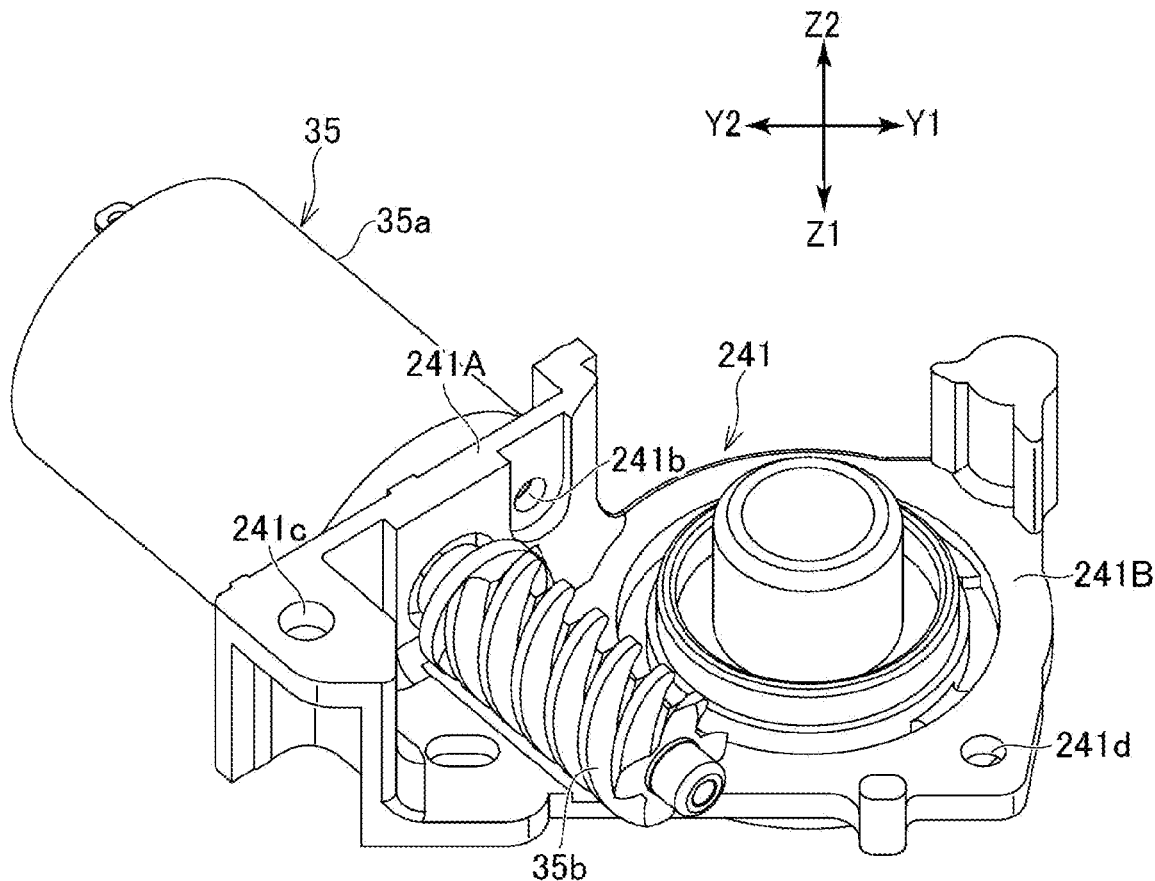
FIG. 11C is a perspective view of the motor bracket and the electric motor coupled to each other and included in the button driving unit illustrated in FIG. 11A.

As illustrated in FIG. 11A, the two holder members 240R and 240L are attached to each other in the left-right direction. The motor bracket 241 is attached to one of the holder members (specifically, the right holder member 240R) in the left-right direction. As illustrated in FIG. 11B, the motor bracket 241 and the holder member 240R are fixed to each other, for example, through a fastener (e.g., a screw or a bolt), which is not illustrated, inserted in the left-right direction. Meanwhile, the electric motor 35 is attached to the motor bracket 241 in a direction that crosses the left-right direction (in more detail, a direction perpendicular thereto). That is, the motor bracket 241 and the holder member 240R are fixed to each other, for example, through a fastener (specifically, a screw), which is not illustrated, inserted in the direction that crosses the left-right direction.

In the configuration in which the electric motor 35 is directly attached to one of the holder members in a direction that crosses the left-right direction, an opening needs to be defined in an outer wall of the holder member to allow a tool for fastening a fastener (specifically, a screw) for the attachment of the electric motor 35 to be inserted into the holder member. To make an explanation with reference to FIG. 11B, for example, a need will arise to define an opening through which a tool for fixing the electric motor 35 to the holder member is to be passed in a wall portion 240a opposed to the electric motor 35. In contrast, in the button driving unit 210, the portion (i.e., the motor bracket 241) to which the electric motor 35 is attached in a direction that crosses the left-right direction is a member separate from the holder members 240R and 240L. Thus, such an opening does not need to be defined in the holder members 240R and 240L. This leads to increased strength of a holder 240.

As illustrated in FIG. 11B, the motor bracket 241 has a first wall portion 241A to which the electric motor 35 is attached. An end surface of a body portion 35a of the electric motor 35 is attached to the first wall portion 241A, for example, in a direction at an angle with respect to the front-rear direction and the up-down direction. The first wall portion 241A has defined therein a plurality of mounting holes 241b (see FIG. 11C) through which fasteners are to be inserted.

Figure 11D:
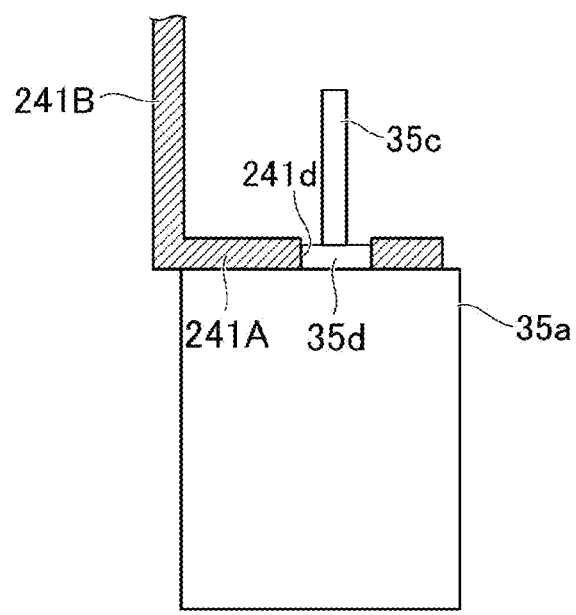
FIG. 11D is a sectional view of the electric motor and the motor bracket included in the button driving unit illustrated in FIG. 11A.

As illustrated in FIG. 11D, the end surface of the body portion 35a of the electric motor 35 has formed thereon a positioning portion 35d that surrounds a rotating shaft 35c. The positioning portion 35d is, for example, a protruding portion. The first wall portion 241A of the motor bracket 241 has defined therein an opening 241d in which the positioning portion 35d is fitted. The opening 241d has an inside diameter corresponding to an outside diameter of the positioning portion 35d, and relative positions of the electric motor 35 and the motor bracket 241 are determined by an edge of the opening 241d. The motor bracket 241 is a member formed separately from the holder members 240R and 240L, and therefore, when the type of the electric motor 35 is changed to a type in which the positioning portion 35d has a different size, for example, replacing only the motor bracket 241, instead of the entire holder, will be enough to enable installation of an electric motor 35 in which the positioning portion 35d has a different size.

As illustrated in FIG. 11B, the holder member 240R has defined therein an opening 240e into which the first wall portion 241A of the motor bracket 241 is fitted. The first wall portion 241A is slid in the left-right direction with respect to edges 240f and 240g of the opening 240e to close the opening 240e. The first wall portion 241A corresponds in size with the opening 240e and reinforces a wall portion of the holder member 240R in which the opening 240e is defined. One of the edges 240f and 240g of the opening 240e and an edge of the first wall portion 241A may have defined therein a groove in which another one of the edges 240f and 240g and the edge of the first wall portion 241A is caught.

As illustrated in FIG. 11B, the motor bracket 241 has defined therein a mounting hole 241c through which a fastener (specifically, a screw) for attaching the motor bracket 241 to the holder member 240R in the left-right direction is inserted. The mounting hole 241c is defined in a mounting wall 241e extending from the first wall portion 241a. The motor bracket 241 has defined therein a positioning hole 241d for fixing the position of the motor bracket 241 with respect to the holder member 240R. A projection formed on the holder member 240R is fitted into the positioning hole 241d, so that the motor bracket 241 is restrained from turning on the mounting hole 241c. In the example of the button driving unit 210, the motor bracket 240M has a second wall portion 241B to be attached to a side wall (i.e., a right side wall) 240h of the holder member 240R. The positioning hole 241d is defined in the second wall portion 24B.

As illustrated in FIG. 11B, the motor bracket 241 is configured to rotatably support an intermediate gear 36. This configuration contributes to preventing a reduction in accuracy in positioning of a gear (worm gear) 35b of the electric motor 35 and the intermediate gear 36. The intermediate gear 36 is supported by an annular support portion 241f formed in the second wall portion 241B. A support shaft 36c of the intermediate gear 36 is inserted in the support portion 241f.

As illustrated in FIG. 11A, in the example of the button driving unit 210, a body portion 20B and an exterior portion 20A of an operation button 20 are formed separately from each other. The body portion 20B is rotatably supported by a support shaft 47, and the exterior portion 20A is attached to the body portion 20B. As is not the case with the example of the button driving unit 210, the exterior portion 20A and the body portion 20B may be formed integrally with each other.

As illustrated in FIG. 11A, an operation button 8 (see FIG. 2) may also be attached to the holder 240. For example, the operation button 8 may be attached to the holder member 240R, i.e., one of the holder members, so as to be capable of moving forward and rearward with respect to the holder member 240R.

The button driving unit 210 may have an elastic member to urge a movable member 30. For example, as illustrated in FIG. 11A, the button driving unit 210 has a spring 237 (more specifically, a torsion spring) to urge the movable member 30. This configuration brings a gear portion 33a of the movable member 30 into constant contact with a small-diameter gear portion 36b of the intermediate gear 36, thus securely restraining vibration of the movable member 30.

In the examples described above, the gear portion 33a is formed on an outer peripheral surface of the movable member 30. Alternatively, the movable member may have, formed in an inner side of the movable member, a gear formed so as to surround the small-diameter gear portion of the intermediate gear and to be engaged with the small-diameter gear portion 36b. FIGS. 12A to 12E are diagrams illustrating a button driving unit 310 as an example button driving unit having such a structure. The following description is provided with a focus placed on differences between the button driving units 10 and 210 and the button driving unit 310. Concerning features that are not described with respect to the button driving unit 310, the button driving unit 310 may be similar in structure to the button driving units 10 and 210.

Figure 12A:
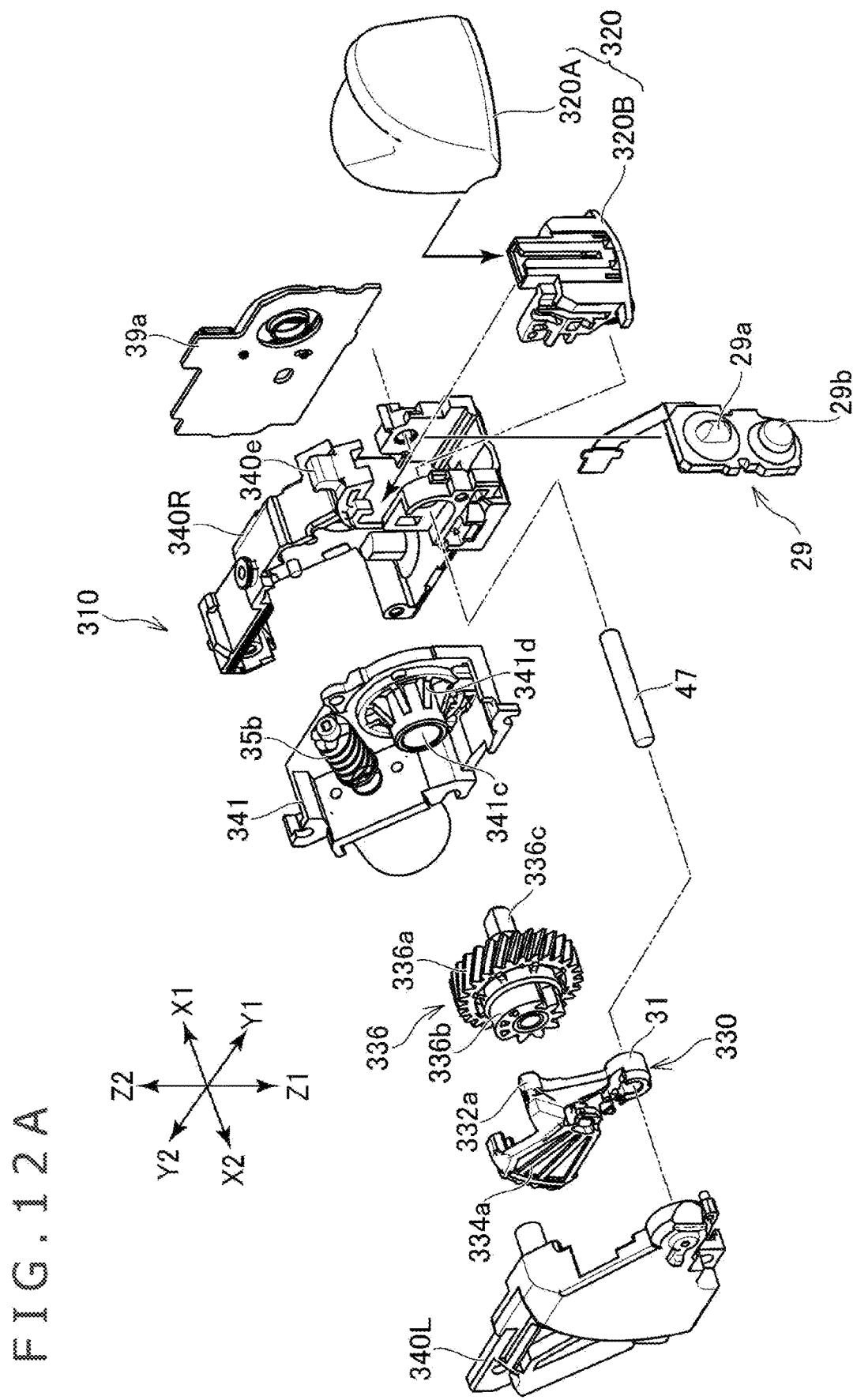
FIG. 12A is an exploded perspective view illustrating yet another example of the button driving unit.

As illustrated in FIG. 12A, the button driving unit 310 has a movable member 330. The movable member 330 is capable of moving around a support shaft 47. The movable member 330 has a wall portion 334a that faces a small-diameter gear portion 336b of an intermediate gear 336 in an axial direction (i.e., the left-right direction), and an outer peripheral portion 334b (see FIG. 12D) that projects from the wall portion 334a toward the intermediate gear 36, and which is positioned in a radial direction with respect to the small-diameter gear portion 336b. The small-diameter gear portion 336b is covered by the wall portion 334a and the outer peripheral portion 334b. A gear portion 334c (see FIG. 12D) that meshes with the small-diameter gear portion 336b is formed on an inner surface of the outer peripheral portion 334b. That is, the gear portion 334c is a generally-called internal gear. The small-diameter gear portion 336b is positioned between the outer peripheral portion 334b and the support shaft 47 (i.e., a center of rotation).

When a front surface of an operation button 320 is pushed and the movable member 330 receives a force from the operation button 320 to rotate around the support shaft 47, the movable member 330 applies, to the intermediate gear 336, a force to cause the intermediate gear 36 to rotate. This force causes a force to move the position of the intermediate gear 36. If the position of the intermediate gear 336 changes, and a large-diameter gear portion 336a of the intermediate gear 336 is pressed against a gear 35b of an electric motor 35, friction between the large-diameter gear portion 36a and the gear 35b can become excessive to inhibit smooth movement of the gear 35b and the intermediate gear 36.

Figure 12B:
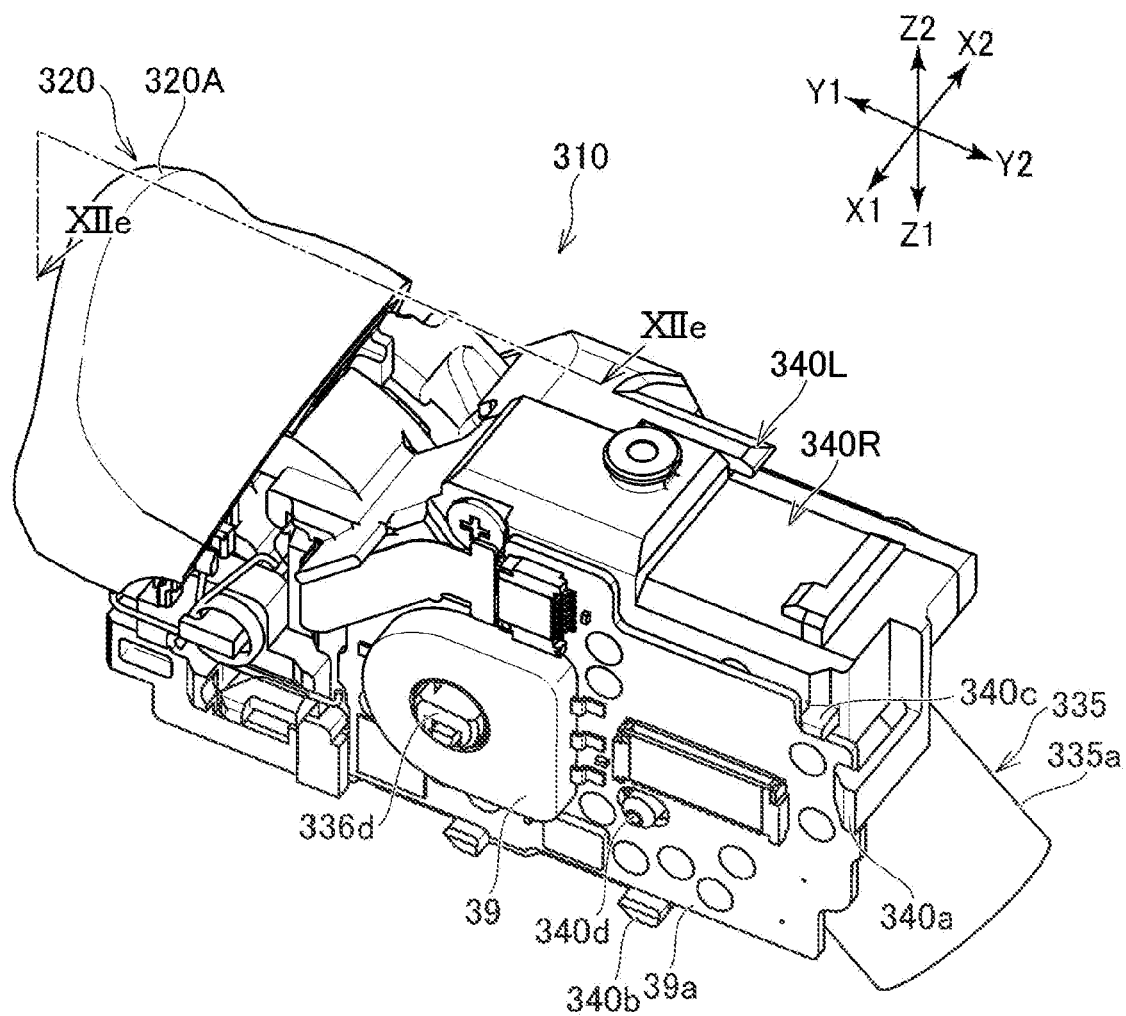
FIG. 12B is a perspective view of the button driving unit illustrated in FIG. 12A.
Figure 12C:
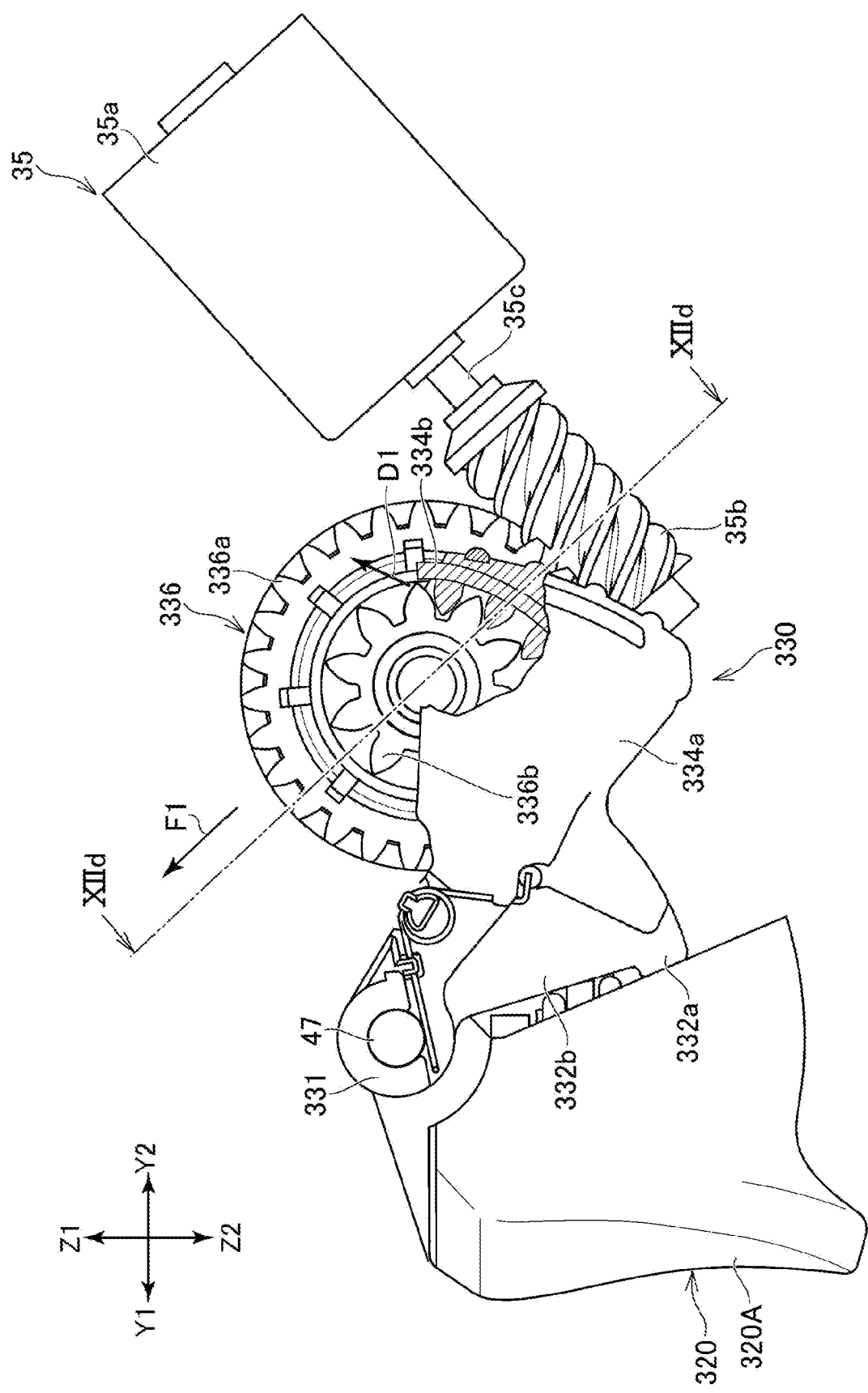
FIG. 12C is a side view of an operation button, a movable member, an intermediate gear, and an electric motor included in the button driving unit illustrated in FIG. 12A.

However, the arrangement of the movable member 330, the intermediate gear 336, and the electric motor 35 in the example of the button driving unit 310 can prevent occurrence of such a problem. As illustrated in FIG. 12C, the small-diameter gear portion 336b of the intermediate gear 336 is positioned on the forward side (i.e., the side on which the support shaft 47 lies) of the outer peripheral portion 334b of the movable member 330. Accordingly, when the front surface of the operation button 320 has been pushed, the movable member 330 applies, to the intermediate gear 336, a force (for example, a force F1 in FIG. 12C) to cause the position of the intermediate gear 336 to move forward or obliquely forward. Meanwhile, the gear 35b of the electric motor 35 is positioned rearward of a center of rotation of the intermediate gear 336. That is, in a side view of the button driving unit 310, the gear 35b of the electric motor 35 is positioned on an opposite side of the outer peripheral portion 334b of the movable member 330 with respect to the small-diameter gear portion 336b of the intermediate gear 336. Accordingly, even if the position of the intermediate gear 336 changes due to the force applied from the movable member 330 to the intermediate gear 336, the large-diameter gear portion 336a of the intermediate gear 336 will not be pressed against the gear 35b of the electric motor 35 with excessive force, allowing smooth rotation of the gear 35b of the electric motor 35 and the intermediate gear 336 to be maintained.

In addition, when compared to the example in which the gear portion 33a is formed on the outer peripheral surface of the movable member 30, the configuration in which the small-diameter gear portion 336b of the intermediate gear 336 is disposed on the inner side of the outer peripheral portion 334b of the movable member 30 is able to achieve an increased distance between the gear portion 334c of the movable member 330 and the support shaft 47. This leads to increased torque of the movable member 330, making it possible to apply a greater force to the operation button 320.

As illustrated in FIG. 12C, the outer peripheral portion 334b of the movable member 330 is positioned on the lower side of the small-diameter gear portion 336b. Accordingly, when the front surface of the operation button 320 is pushed and the movable member 330 rotates around the support shaft 47, the movable member 330 applies, to the intermediate gear 36, a force to rotate the intermediate gear 36 counterclockwise. Thus, teeth of the large-diameter gear portion 336a which are engaged with the gear 35b of the electric motor 35 press the gear 35b of the electric motor 35 obliquely rearward and upward. A body portion 35a of the electric motor 35 is positioned obliquely rearward and upward of the gear 35b. That is, when the front surface of the operation button 320 has been pushed, the teeth of the large-diameter gear portion 336a press the gear 35b of the electric motor 35 toward the body portion 35a of the electric motor 35.

On a rotating shaft 35c of the electric motor 35, to which the gear 35b is attached, a force that attracts the rotating shaft 35c toward the body portion 35a acts due to a magnetic force inside the electric motor 35. When the rotating shaft 35c and the gear 35b are pulled forward (i.e., when the rotating shaft 35c and so on are pulled in a direction away from the body portion 35a) against such a magnetic force, the rotating shaft 35c can slightly move to cause slight collision noise. In the button driving unit 310, when a direction in which the gear portion 334c (i.e., internal teeth) of the movable member 330 strikes against the small-diameter gear portion 336b (i.e., a direction indicated by "Dl" in FIG. 12C) is defined as a first direction, the body portion 35a of the electric motor 35 is positioned in the first direction of the gear portion 35b. Specifically, when the front surface of the operation button 320 has been pushed, the gear portion 334c (i.e., the internal teeth) of the movable member 330 strikes against the small-diameter gear portion 336b obliquely rearward and upward. The body portion 35a of the electric motor 35 is positioned obliquely rearward and upward of the gear portion 35b of the electric motor 35. Accordingly, when the front surface of the operation button 320 has been pushed, the teeth of the large-diameter gear portion 336a push the gear 35b and the rotating shaft 35c of the electric motor 35 toward the body portion 35a of the electric motor 35. This leads to preventing occurrence of collision noise. Note that the direction in which the gear portion 334c of the movable member 330 strikes against the small-diameter gear portion 336b when the front surface of the operation button 320 has been pushed, and the direction in which the body portion 35a of the electric motor 35 is positioned with respect to the gear portion 35b of the electric motor 35, may not necessarily coincide with each other, but may be at an angle with respect to each other.

The shape of the movable member 330 having the gear portion 334c which is an internal gear is not limited to the example of the driving unit 310. For example, the movable member 330 may have the shape of a circular arc, surrounding an outer peripheral surface of the small-diameter gear 336b. In this case, the movable member 330 may not have the wall portion 334a positioned in the axial direction with respect to the small-diameter gear 336b.

As illustrated in FIG. 12C, the movable member 330 has a projecting portion 332a to push the operation button 320. An extent to which the projecting portion 332a projects forward is smaller than an extent to which the projecting portion 32 of each of the movable members 30 and 230 of the above-described button driving units 10 and 210 projects. The movable member 330 has a reinforcing wall 332b extending from a base portion of the projecting portion 332a toward a supported portion 31. The reinforcing wall 332b protrudes forward relative to the wall portion 334a in which the gear portion 334c engaged with the small-diameter gear portion 336b of the intermediate gear 336 is formed. Presence of the reinforcing wall 332b makes it possible to achieve a reduced length of the projecting portion 332a, and achieve increased strength. For example, a reduction in the likelihood that the projecting portion 332a will be bent when the projecting portion 332a pushes the operation button 320 can be achieved.

As illustrated in FIG. 12A, similarly to the button driving unit 210, the button driving unit 310 has a motor bracket 341 to which the electric motor 35 is attached, in addition to a right holder member 340R and a left holder member 340L. The motor bracket 341 is a member formed separately from the holder members 340R and 340L. That is, the motor bracket 341 is formed using a mold separate from a mold used in a process of molding the holder members 340R and 340L. This configuration enables a working process of attaching the electric motor 35 to the motor bracket 341, and thereafter attaching the motor bracket 341 to the holder members 340R and 340L. This simplifies an operation of attaching the electric motor 35.

As illustrated in FIG. 12A, the motor bracket 341 has formed therein a tubular support portion 341c which has a support shaft 336c of the intermediate gear 336 fitted therein to support the support shaft 336c. A plurality of ribs 341d are arranged along an outer circumferential surface of the support portion 341c. These ribs 341d increase strength of the support portion 341c. The height of each rib 341d (i.e., the distance from a rotation center line Ax4 of the intermediate gear 336 to a top of the rib 341d) decreases with decreasing distance from a distal end (i.e., a left end) of the support portion 341c (see FIG. 12D).

Figure 12D:
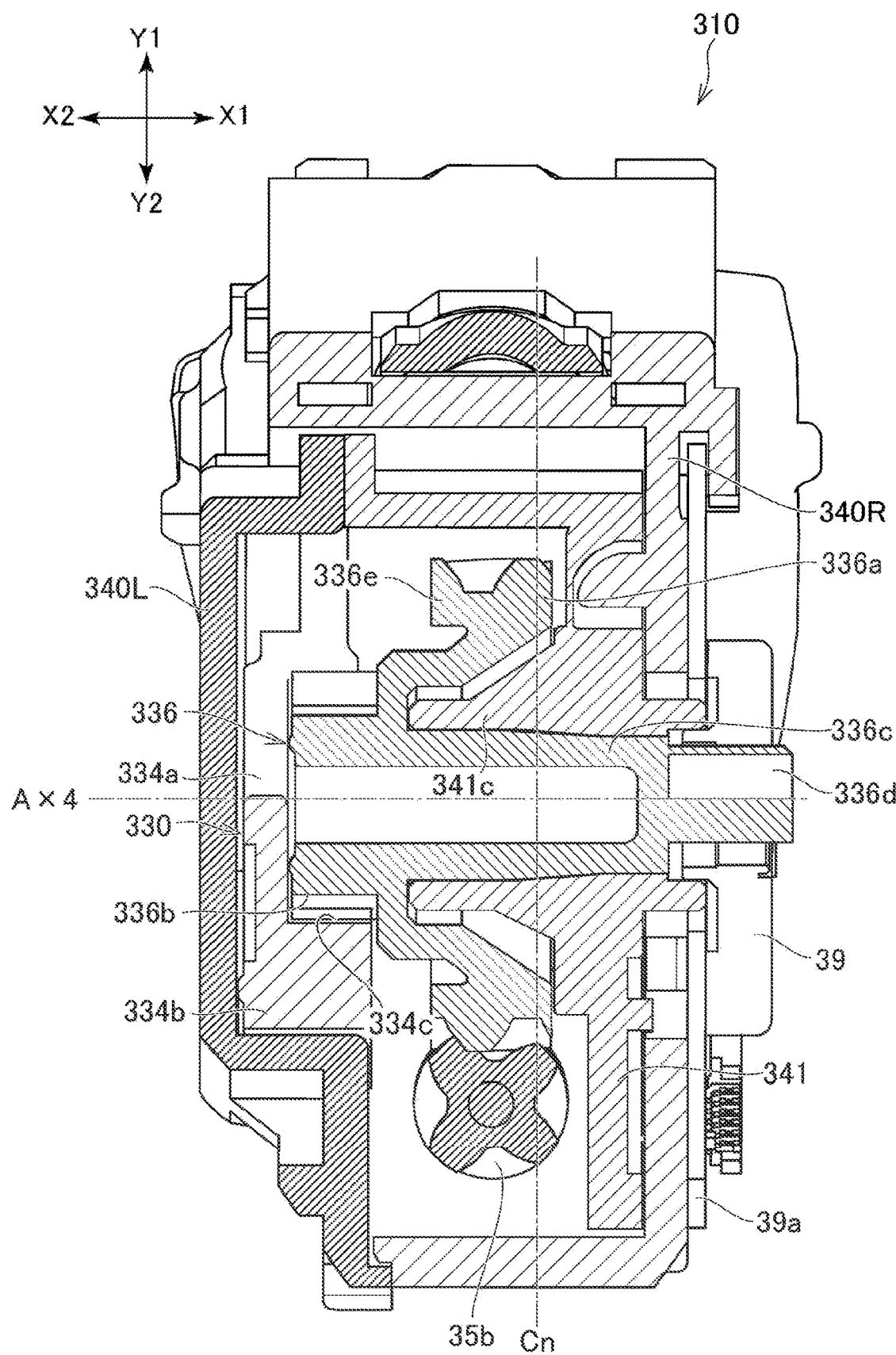
FIG. 12D is a sectional view taken along line XIId-XIId in FIG. 12C.

As illustrated in FIG. 12D, the intermediate gear 336 has a recessed portion defined around the support shaft 336c, and the support portion 341c is fitted in this recessed portion. The support portion 341c has a portion positioned radially inside of a gear portion (in more detail, the large-diameter gear portion 336a).

An end portion of the intermediate gear 336 on one side is supported by the support portion 341c of the motor bracket 341, while an end portion of the intermediate gear 336 on an opposite side is covered by the wall portion 334a of the movable member 330, and is not supported by another portion. The above-described configuration in which the support portion 341c of the motor bracket 341 is fitted in the recessed portion defined around the support shaft 336c of the intermediate gear 336 to support the support shaft 336c of the intermediate gear 336 makes it possible to ensure a sufficient length of the support portion 341c, and improve stability in supporting the intermediate gear 336.

In the example of the button driving unit 310, an end portion (i.e., a left end) of the support portion 341c extends leftward beyond a position of the large-diameter gear portion 336a (i.e., a left side surface 336e of the large-diameter gear portion 336a). In addition, the support portion 341c crosses a center Cn of the intermediate gear 336 in the left-right direction.

As illustrated in FIG. 12A, the two holder members 340R and 340L are attached to each other in the left-right direction. The motor bracket 341 is attached to one of the holder members (specifically, the right holder member 340R). As illustrated in FIG. 12B, the button driving unit 310 has a board 39a on which a sensor 39 to sense the rotational position of the intermediate gear 336 is mounted. The sensor 39 is, for example, an encoder. The board 39a is attached to, for example, the right holder member 340R. In more detail, as illustrated in FIG. 12D, the board 39a is attached to a right side surface of the right holder member 340R, and an end portion 336d of the support shaft 336c of the intermediate gear 336 is fitted in an opening of the sensor 39. A change in relative positions of the board 39a and the holder member 340R may be permitted. This will contribute to preventing a mechanical stress from occurring between the sensor 39 and the intermediate gear 336.

In the example of the button driving unit 310, as illustrated in FIG. 12B, the holder member 340R has a plurality of engagement portions 340a, 340b, and 340c which surround an edge of the board 39a. In addition, a projection portion 340d is formed on a side surface of the holder member 340R, and the board 39a has defined therein a hole having a size greater than that of the projection portion 340d. This configuration contributes to preventing a mechanical stress from occurring between the sensor 39 and the end portion 336d of the support shaft 336c of the intermediate gear 336.

As illustrated in FIG. 12A, the operation button 320 has an exterior portion 320A and a body portion 320B. The exterior portion 320A and the body portion 320B are, for example, coupled to each other in the up-down direction. For example, as illustrated in FIG. 12E, the body portion 320B has defined therein a groove 320a opening downward.

Meanwhile, the exterior portion 320A is formed so as to cover the body portion 320B, and has formed in the inside thereof a projection portion 320b to be fitted into the groove 320a. This restrains the body portion 320B and the exterior portion 320A from being separated from each other in the front-rear direction.

Figure 12E:
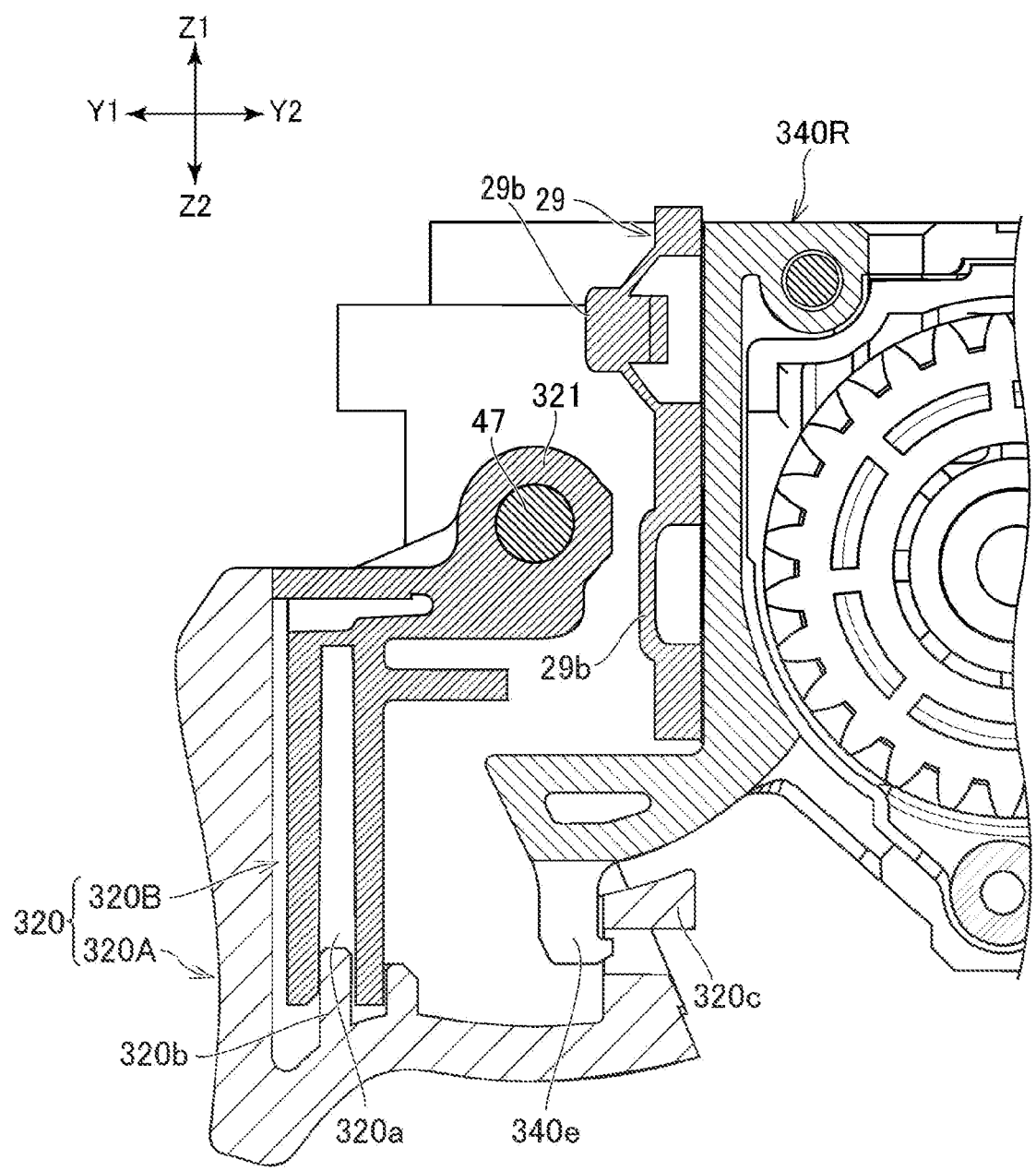
FIG. 12E is a sectional view taken along line XIIe-XIIe in FIG. 12B.

As illustrated in FIG. 12E, in the example of the button driving unit 310, an upper portion of the body portion 320B has formed therein a supported portion 321 into which the support shaft 47 is inserted. The operation button 320 is capable of moving around the support shaft 47. On the rearward side of the body portion 320B, a sensor 29 on which an electrically conductive rubber 29b to sense a movement thereof is mounted is disposed. The sensor 29 may have a switch 29b positioned on the rearward side of an operation button 8 (see FIG. 2) disposed on the upper side of the operation button 320.

The supported portion 321 is capable of moving rearward from an initial position (i.e., a position illustrated in FIG. 12E) around the support shaft 47. The button driving unit 310 may have a structure to prevent the operation button 320 from coming off forward when the operation button 320 in the initial position has been pulled forward.

As illustrated in FIG. 12E, in the example of the button driving unit 310, the right holder member 340R has formed therein a stopper portion 340e to restrain the operation button 320 from coming off forward. The operation button 320 has formed therein a stopped portion 320c with which the stopper portion 340e is engaged when the operation button 320 moves forward. In more detail, the stopped portion 320c is formed in a rearmost portion of a lower edge of the exterior portion 320A, and projects upward. The stopper portion 340e is positioned on the forward side of the stopped portion 320c.

Since the stopper portion 340e is formed in the holder member 340R instead of in a cabinet 2 (see FIG. 1) that houses the button driving unit 310, an operation of assembling the button driving unit 310 can be made easier.

Note that an operation input device proposed in the present disclosure may be stick-like. In this case, the number of button driving units 10 included in the operation input device may be one.

Figure 13:
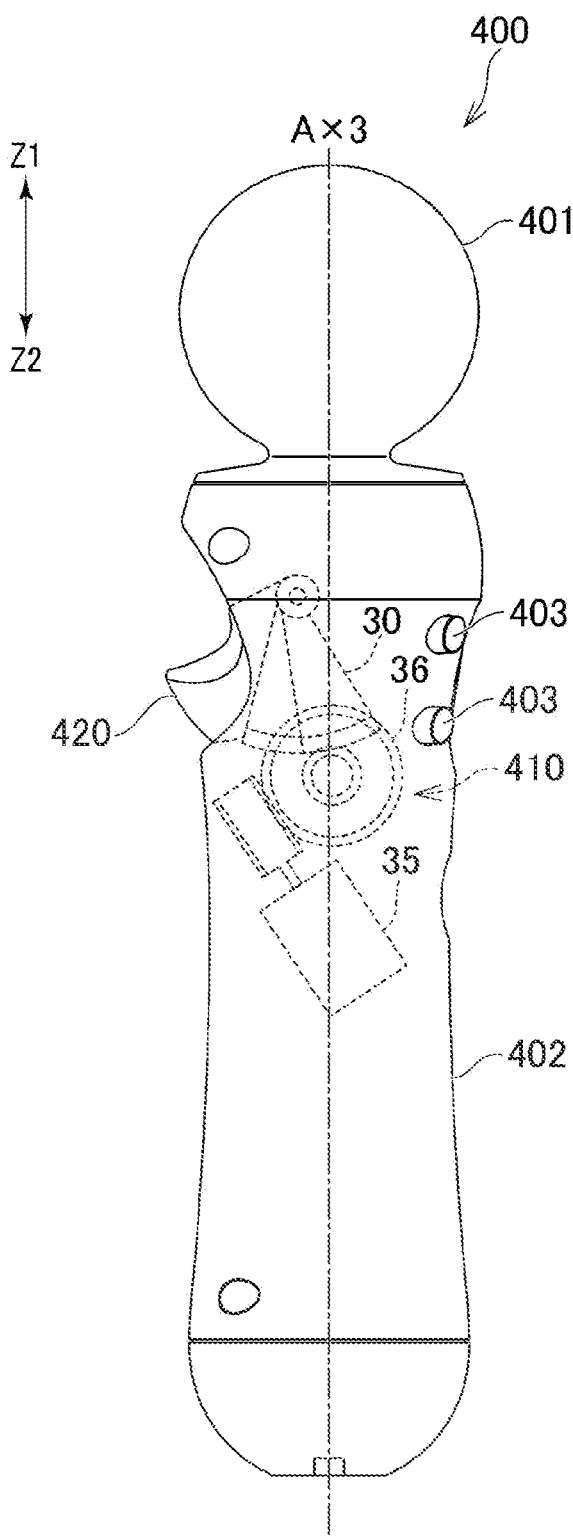
FIG. 13 is a plan view illustrating another example of the operation input device proposed in the present disclosure.

FIG. 13 is a diagram illustrating an example of such a stick-like operation input device. An operation input device 400 illustrated in this figure is stick-like, and a user is able to hold the operation input device 400 with one hand. The operation input device 400 has a button driving unit 410. The button driving unit 410 has an operation button 420, a movable member 30, an intermediate gear 36, and an electric motor 35. The operation button 420 projects from an outer peripheral surface of a cabinet 402 of the operation input device 400, and is capable of moving in a radial direction of the operation input device 400 around an axis Ax3. The movable member 30 is positioned on the inner side of the operation button 420. The intermediate gear 36 is positioned below the movable member 30, and the electric motor 35 is positioned below the intermediate gear 36. The operation button 420, the movable member 30, the intermediate gear 36, and the electric motor 35 are held by a holder, which is not illustrated.

Note that the operation input device 400 has a spherical light emitting portion 401 in an uppermost portion thereof. In addition, the operation input device 400 has operation buttons 403 on an opposite side with respect to the operation button 420.

The button driving units 10, 210, 310, and 410 have been described above. Note that features of each of the button driving units 10, 210, 310, and 410 may be combined with features of another one of the button driving units 10, 210, 310, and 410.

The invention claimed is:

1. An operation input device comprising:
an operation button capable of moving from an initial position in a direction along a first plane when having received a pushing operation by a user;
a movable member capable of moving in the direction along the first plane and having an end portion operating to engage and disengage with a receiving surface of the operation button, where the end portion operates to engage the receiving surface in order to push the operation button toward the initial position;
an electric motor that moves the movable member;
a holder that holds the electric motor, and supports the operation button and the movable member so as to permit movement of the operation button and the movable member, wherein the holder has a first holder member and a second holder member coupled to each other in a direction that crosses the first plane;
a support shaft that engages with and is supported by the holder, the support shaft being oriented along a support axis that intersects the first plane and engages both the operation button and the movable member such that they are rotatable about the support axis; and
a first sensor configured to detect a pressing operation by a user on the operation button, wherein the first sensor is attached to the first holder member,
wherein a width of the first holder member in the direction that crosses the first plane is greater than a width of the second holder member in the direction that crosses the first plane.

2. The operation input device according to claim 1, wherein
the operation button is capable of moving around the support shaft that crosses the first plane, and
the holder supports the operation button through the support shaft.

3. The operation input device according to claim 1, wherein
the movable member is capable of moving around the support shaft that crosses the first plane, and
the holder supports the movable member through the support shaft.

4. The operation input device according to claim 1, wherein
both the operation button and the movable member are capable of moving around the support shaft that crosses the first plane, and
the holder supports the operation button and the movable member through the support shaft.

5. The operation input device according to claim 4, wherein a position of the movable member in a direction along the support shaft is displaced from a center of the operation button in the direction along the support shaft.

6. The operation input device according to claim 4, wherein
the movable member has a supported portion positioned on the support axis of the support shaft, and
a position of the supported portion in a direction along the support axis is between a side surface of the operation button on one side and a side surface of the operation button on an opposite side.

7. The operation input device according to claim 1, further comprising:
a second sensor to sense a position of the movable member,
wherein the second sensor is attached to the first holder member.

8. The operation input device according to claim 1, further comprising:
a further sensor to sense a position of the movable member, wherein
the further sensor is attached to the holder.

9. The operation input device according to claim 1, further comprising:
a transmission system that transfers rotation of the electric motor to the movable member while reducing a speed of the rotation,
wherein the holder supports the transmission system.

10. The operation input device according to claim 1, further comprising:
an intermediate gear capable of rotating around the support shaft, which is a first support shaft, to transfer rotation of the electric motor to the movable member, wherein
at least one of the operation button and the movable member is capable of moving around a second support shaft that crosses the first plane, and
the first support shaft and the second support shaft are parallel to each other and are supported by the holder.

11. The operation input device according to claim 1, wherein the electric motor is disposed such that a rotating shaft of the electric motor extends along the first plane.

12. The operation input device according to claim 1, further comprising:
an intermediate gear capable of rotating around the support shaft, which is a first support shaft, to transfer rotation of the electric motor to the movable member, wherein
at least one of the movable member is capable of moving around a second support shaft that crosses the first plane,
the movable member has a gear portion engaged with the intermediate gear, and
the intermediate gear is positioned between a gear of the movable member and the second support shaft.

13. A button driving unit comprising:
a body portion capable of moving from an initial position in a direction along a first plane when an operation button has received a pushing operation by a user, the body portion being attached to an exterior portion of the operation button or being formed integrally with the exterior portion;
a movable member capable of moving in the direction along the first plane and having an end portion operating to engage and disengage with a receiving surface of the operation button, where the end portion operates to engage the receiving surface in order to push the operation button toward the initial position;
an electric motor that moves the movable member;
a holder that holds the electric motor, and supports the operation button and the movable member so as to permit movement of the operation button and the movable member, wherein the holder has a first holder member and a second holder member coupled to each other in a direction that crosses the first plane;
a support shaft that engages with and is supported by the holder, the support shaft being oriented along a support axis that intersects the first plane and engages both the operation button and the movable member such that they are rotatable about the support axis; and
a first sensor configured to detect a pressing operation by a user on the operation button, wherein the first sensor is attached to the first holder member,
wherein a width of the first holder member in the direction that crosses the first plane is greater than a width of the second holder member in the direction that crosses the first plane.

14. An operation input device comprising:
an operation button capable of moving from an initial position in a direction along a first plane when having received a pushing operation by a user;
a movable member capable of moving in the direction along the first plane and capable of pushing the operation button toward the initial position;
an electric motor that moves the movable member;
a holder that holds the electric motor, and supports the operation button and the movable member so as to permit movement of the operation button and the movable member, where the holder has a first holder member and a second holder member coupled to each other in a direction that crosses the first plane, and a width of the first holder member in a direction that crosses the first plane is greater than a width of the second holder member in a direction that crosses the first plane; and
a first sensor attached to the first holder member and operable to sense a pushing operation on the operation button.

15. The operation input device according to claim 14, wherein at least one of:
at least one of the operation button and the movable member is capable of moving around a support shaft that crosses the first plane;
the holder supports the at least one of the operation button and the movable member through the support shaft;
a position of the movable member in a direction along the support shaft is displaced from a center of the operation button in the direction along the support shaft;
the movable member has a supported portion positioned on an axis of the support shaft; and
a position of the supported portion in a direction along the axis is between a side surface of the operation button on one side and a side surface of the operation button on an opposite side.

16. The operation input device according to claim 14, further comprising at least one of:
a second sensor to sense a position of the movable member, wherein the second sensor is attached to the first holder member;
a further sensor to sense a position of the movable member, wherein the further sensor is attached to the holder.

17. The operation input device according to claim 14, further comprising:
a transmission system that transfers rotation of the electric motor to the movable member while reducing a speed of the rotation,
wherein the holder supports the transmission system.

18. The operation input device according to claim 14, further comprising:
an intermediate gear capable of rotating around a first support shaft to transfer rotation of the electric motor to the movable member, wherein at least one of:

at least one of the operation button and the movable member is capable of moving around a second support shaft that crosses the first plane, the first support shaft and the second support shaft are parallel to each other and are supported by the holder, the movable member has a gear portion engaged with the intermediate gear, the intermediate gear is positioned between a gear of the movable member and the second support shaft, and the electric motor is disposed such that a rotating shaft of the electric motor extends along the first plane.

* * * * *